United States Patent [19]

Gorbold et al.

[11] 4,240,100
[45] Dec. 16, 1980

[54] TELEVISION INTERVAL TIMER EMPLOYING DIGITAL TECHNIQUES

[75] Inventors: Jonathan M. Gorbold, Park Ridge; David H. Slim, Cresskill, both of N.J.

[73] Assignee: Marconi Electronics, Inc., Northvale, N.J.

[21] Appl. No.: 18,457

[22] Filed: Mar. 8, 1979

[51] Int. Cl.³ .............................................. H04N 9/62
[52] U.S. Cl. ...................................... 358/10; 358/139
[58] Field of Search ......................... 358/10, 139, 185

[56] References Cited

U.S. PATENT DOCUMENTS

| | | | |
|---|---|---|---|
| 3,792,195 | 2/1974 | Wilson et al. | 358/139 |
| 3,995,105 | 11/1976 | Krivosheev et al. | 358/139 |

Primary Examiner—Richard Murray
Attorney, Agent, or Firm—Arthur L. Plevy

[57] ABSTRACT

A television interval timer generates a plurality of gating waveforms which when applied to digital circuitry, serve to gate out various portions of a television waveform determinative of a parameter to be measured. The parameter to be measured is selected by means of a selector panel which assigns a predetermined address to that parameter. The address is employed to select the proper gating waveform, the reference level at which the measurement is to be made, and the transition at the start and finish of the measurement. A counter is controlled to count a number of transitions which occur during the selected interval and which is a direct indication of the duration or timing interval associated with the parameter selected. The contents of the counter are directly displayed on a digital display to enable the user to directly view the parameter measured. The interval timer is capable of performing measurements on selected parameters which occur on a line to line basis and on parameters which occur on a field basis. Certain parameters are measured in a minimum mode. In this mode, the smallest value of the parameter as occuring during a number of samples is displayed. In an average mode, the average value of the parameter is displayed. Certain other parameters are measured by a direct measurement such as an analog to digital conversion. All measurements are made between standard operating levels and hence, the user is assured that the measurement displayed is not only correct in regard to its time, but also has been made between specific amplitude levels.

22 Claims, 12 Drawing Figures

HB = HORIZONTAL BLANKING
PB = PICTURE BLANKING
FP = FRONT PORCH
SW = SYNC WIDTH
SBS = SYNC TO BURST START
SBE = SYNC TO BURST END

SVS = SYNC TO VIDEO START
CBW = COLOR BURST WIDTH
SRT = SYNC RISE TIME
S = SYNC AMPLITUDE
BA = BURST AMPLITUDE

VS = VERTICAL SERRATION
EP = EQUALIZING PULSE

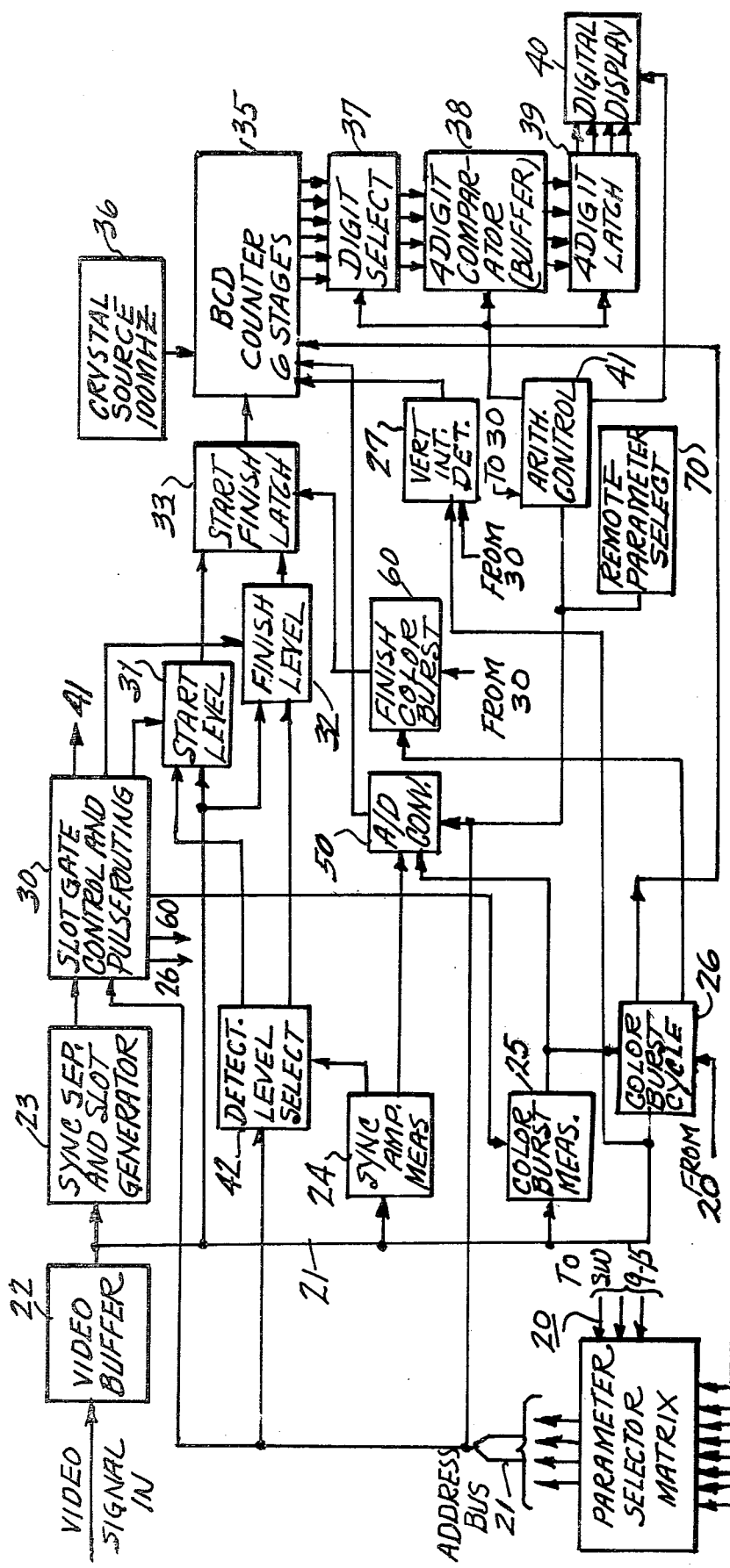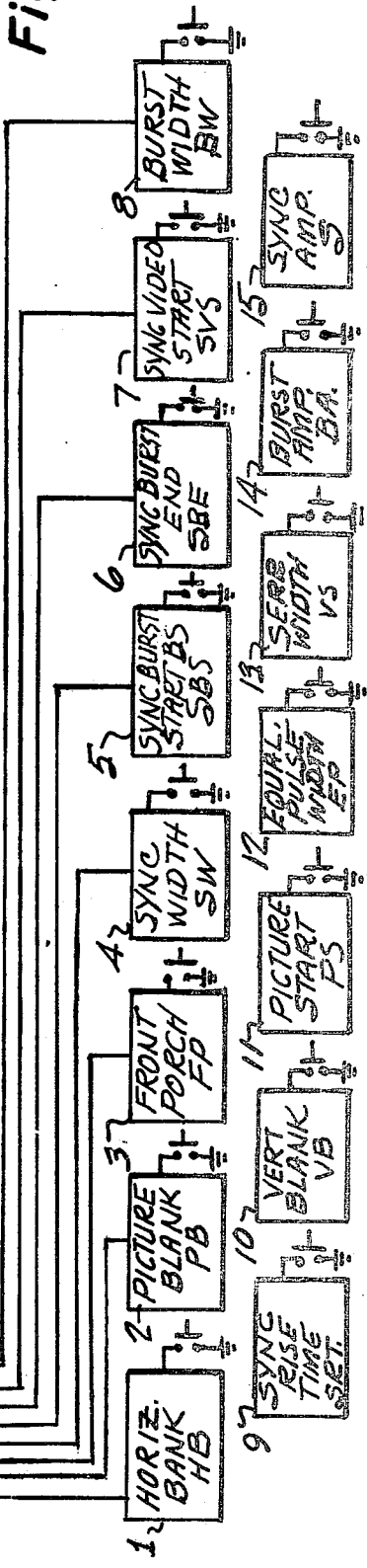
Fig. 3.

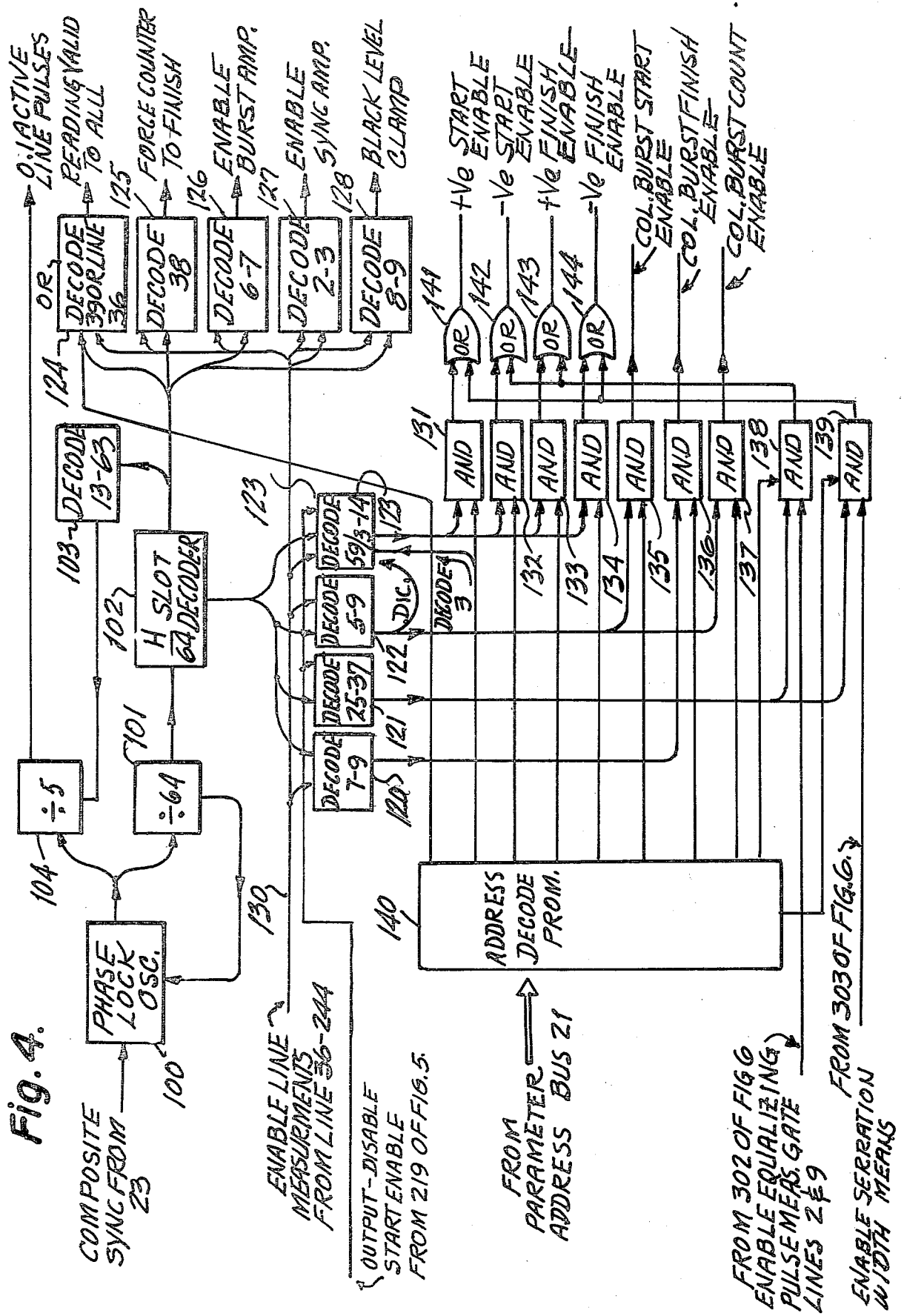

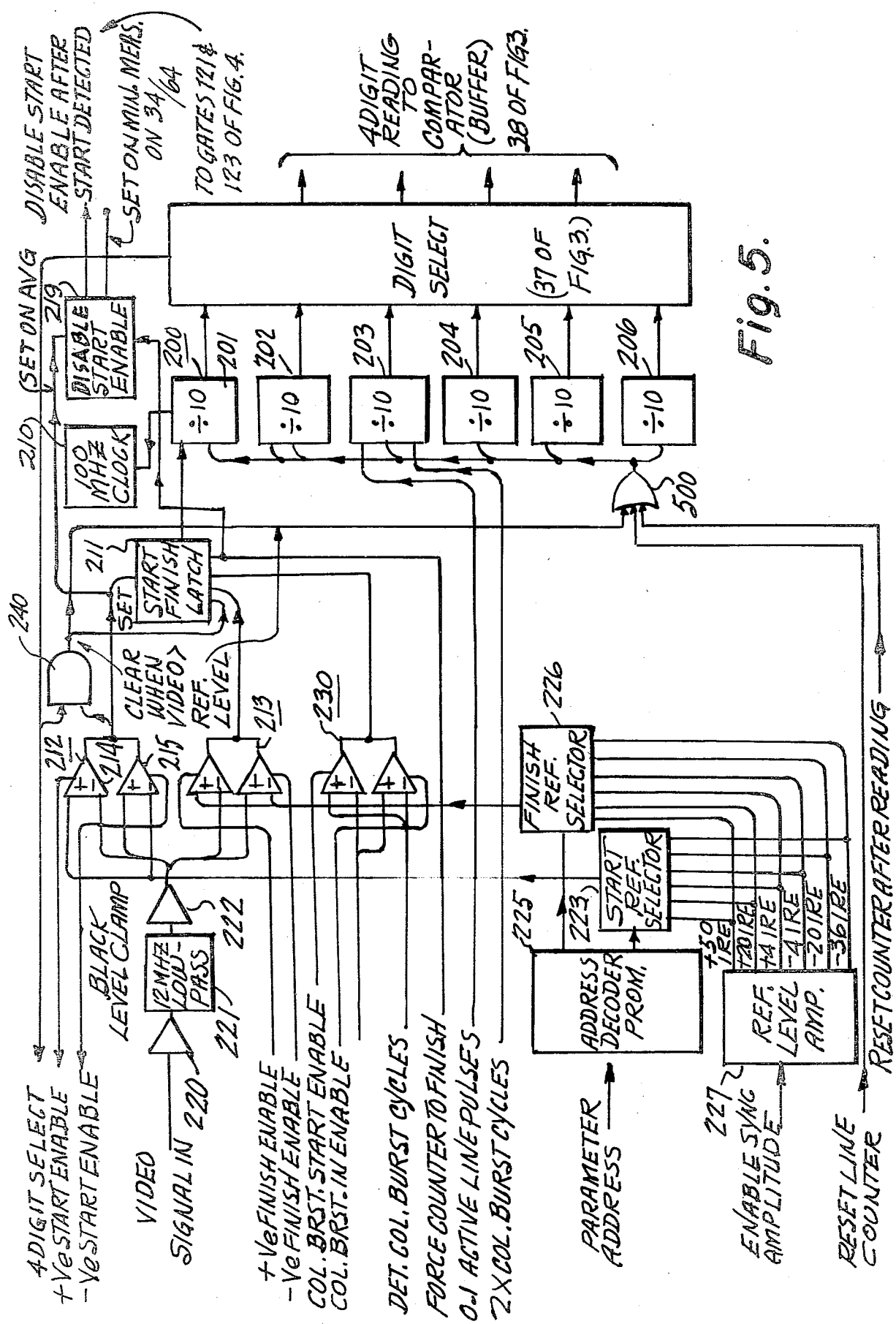

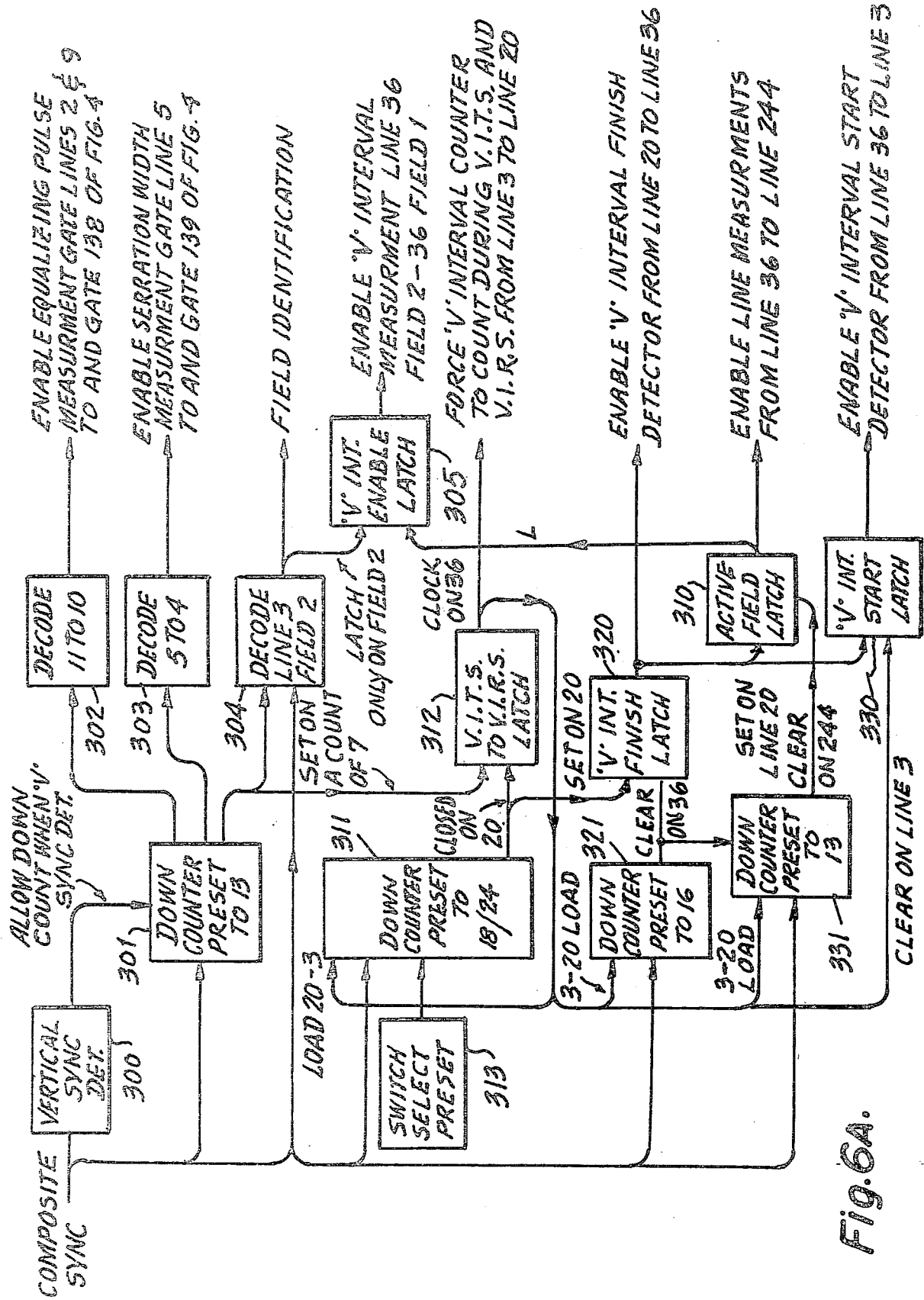

# TELEVISION INTERVAL TIMER EMPLOYING DIGITAL TECHNIQUES

BACKGROUND OF INVENTION

This invention relates to television measuring apparatus and more particularly to apparatus employing digital techniques for measuring time intervals associated with a television signal.

As is well known, television standards are criteria which dictate the characteristics to be employed in a television system. The standards assure that the component parts of the system are designed and operated on a common basis to optimize performance available in regard to a particular system.

Essentially, the timing intervals associated with the television signal are sometimes referred to as scanning standards and synchronization standards. The manner in which a television scene is explored or processed for its luminance and chrominance value is defined by the scanning standards.

To coordinate the scanning and color modulation processes of transmitters and receivers, four forms of sychronization signals are employed. Generically, these can be referred to as (1) vertical sync signals, (2) equalizing sync signals, (3) horizontal sync signals, and (4) color sync signals. The first three of these are collectively known as the deflection sync signals. The function of these signals is to initiate the vertical and horizontal retrace motions in scanning deflection. These signals are common and are employed in both color and monochrome transmissions.

The color sync signal which is employed in a color transmission constitutes the phase reference employed in the modulation of the chrominance subcarrier. In the composite television signal, the deflection sync signals occupy the portion of the modulation envelope adjacent to the blanking level and separate from the picture information region. The color sync signal is centered on the blanking level and extends in part into the picture information region. It is customary, for example, to specify the synchronization signals in diagrammatic form and many texts show the complete nature of the signal in such form. Reference is made, for example, to a text entitled "Electronic Engineers Handbook" by Donald G. Fink, a McGraw-Hill publication (1975), Chapter 20 which has representations of such diagrams clearly showing the synchronization signals briefly described above.

Based on present F.C.C. transmission specifications and based on Governmental requirements imposed upon the broadcasting facilities, it is necessary to monitor such intervals and to assure that the television signal as transmitted corresponds to the governing agency's requirements. The measurement of such intervals has been accomplished in the prior art by employing various types of equipment generally designated as wave form monitors or wave form analyzers. These devices basically employ a special type of oscilliscope, since the average oscilliscope does not incorporate the necessary refinements that are required for such examinations.

Essentially, a wave form monitor can be locked to a particular field and line that is of interest and such devices have means for expanding the display to the degree necessary to observe the slope of the leading or trailing edges of special pulses. Such monitors generally employ a wide band deflection amplifier, a driven type sweep circuit, a special type of sychronizing system which may include a calibrated sychronization delay circuit, a precision sweep calibrator and a high voltage cathode ray tube. The prior art devices as described above enable one to view the television signal on the face of an oscilliscope and based on the sweep rate and so on, the user or technician can make visual determinations and calculations in order to assure that the timing intervals are within the necessary specifications. As one can ascertain, these techniques require skill in that careful interpretation and observation are required.

It is an object of the present invention to perform the measurement of timing intervals automatically and to display in digital form, the value indicative of the interval selected. The apparatus allows the automatic logging and remote monitoring of timing measurements as would be required in studios, transmission networks and at unattended transmitter operations.

The apparatus to be described employs digital processing techniques to enable one to select a parameter, to be measured, by means of a pushbutton or selectively activated switch associated with that function and located on the front panel of the interval timer. In this manner, a user can select any one of a plurality of timing intervals associated with the television signal and obtain a direct digital readout of the interval.

As should be apparent, the television interval timer to be described substantially reduces the amount of time and effort required to make such measurements to thereby enable a television broadcaster to maintain the specifications required by the particular governmental agency.

BRIEF DESCRIPTION OF THE PREFERRED EMBODIMENT

Apparatus for measuring the time duration of parameters associated with a television signal, said parameters to be measured with a conventional television signal and having timing intervals which are predetermined according to standards associated with said television signal, comprising means responsive to said television signal to provide a timing signal synchronized thereto and consisting of a predetermined number of equally spaced pulses indicative of a television line, selectable means operative to select any one of a given number of parameters to be measured, logic means responsive to said selectable means and said timing signal to generate a control signal containing a selected number of said pulses which are indicative of the timing interval of said parameter within said television line, reference means responsive to said selectable means and operative to provide a reference level for determining whether said television signal exhibits a level within predetermined limits for said parameter selected, counting means responsive to said reference means and said control signal for providing a count indicative of said timing interval of said parameter when said television signal exhbiits said level within said predetermined limits, and means coupled to said counting means for displaying said count whereby the timing interval associated with said parameter is displayed.

BRIEF DESCRIPTION OF THE FIGURES

FIG. 3 is a simplified block diagram of a television interval timer according to this invention.

FIG. 4 is a block diagram of a slot generator, gate control and pulse routing circuit according to this invention.

FIG. 5 is a block diagram of a counter and control employed in the television interval timer.

FIG. 6 and 6B is a block diagram of a vertical interval detector according to this invention.

DETAILED DESCRIPTION OF INVENTION

Before proceeding with a description of the television interval time apparatus according to this invention, it is believed that an explanation of the television signal as well as the parameters which are to be measured is warranted.

HORIZONAL BLANKING

Figure 1:
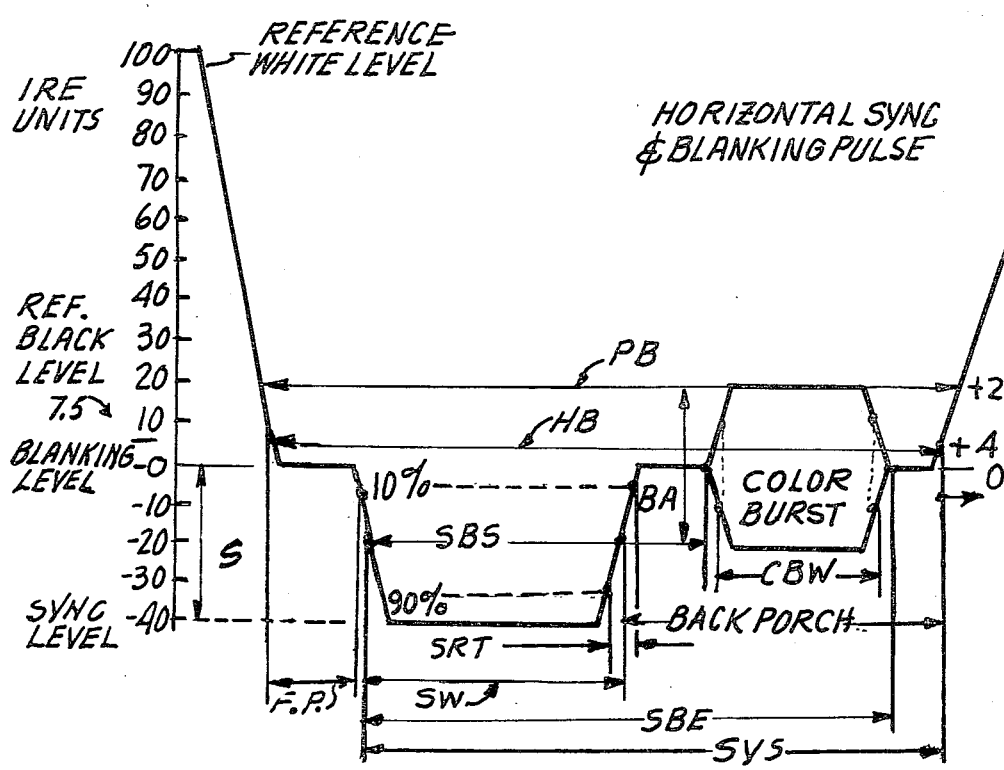
FIG. 1 is a timing waveform of a video signal showing the parameters to be measured.

Referring to FIG. 1, there is shown a portion of a television signal which is definitive of the horizontal sync and blanking information. Essentially, the horizontal sync pulses initiate the retrace at the end of each television line and accordingly, they recur at the horizontal scanning rate. The horizontal scanning rate is nominally 63.556 microseconds in the American system and about 64 microseconds in the European system. The nominal width of the horizontal blanking pulse HB as shown in FIG. 1 is measured at +4 IRE units. An IRE unit is an arbitrary value specifed by the Institute of Radio Engineers and 100 IRE units exist between the blanking level which is zero IRE and the reference white level which is at 100 IRE. The nominal width of the horizontal blanking pulse at 10 IRE units is 10.9±0.2 microseconds. The total width of the horizontal blanking pulse ranges from 16% to 20% of the line period in most conventional television systems. In the American color system, the horizontal blanking pulse is specified to be between 0.165 H minimum to 0.18 H maximum where H is the time interval from the beginning of one line to the beginning of the next line or approximately 63.5 microseconds.

As is known, the function of horizontal blanking is to allow time for the scanning spot to return from the end of each line to the beginning of the next.

As one can ascertain from the above description, the width HB can vary over a fairly wide range in a typical television system and still can be within tolerances. Essentially, the duration of the horizontal sync pulses is a compromise and they should be large enough to possess sufficient energy to override random noise, but they must occupy only a portion of the horizontal blanking pedestal to permit adequate recovery of the video amplifiers prior to active scanning. As will be explained, the apparatus to be described will provide an accurate measurement of the width of the horizontal blanking pulse as indicated by line HB of FIG. 1.

PICTURE BLANKING

Picture blanking is basically the same as horizontal blanking and is generally employed to assure that the return trace between successive pictures remains invisible. Picture blanking is performed by the horizontal blanking pulse and is measured between either +20 or +90 IRE units and is basically designated and shown on FIG. 1 as PB.

FRONT PORCH

As is known, the front porch FP is the portion of the composite picture signal that lies between the leading edge of the horizontal blanking pulse and the leading edge of the corresponding sychronizing pulse and is designated in FIG. 1 by the line FP. The front porch in the American system is specified as being a minimum of 0.02 H or approximately 1.27 microseconds.

If reference is made to FIG. 1, the effective width of the front porch signal is nominally measured between the start of the horizontal blanking pulse at +4 or +20 IRE units and the center of the leading edge of the sync pulse at −20 IRE units. This value is normally set and specified at 1.5±0.1 microseconds for most American color broadcast facilities.

In the European systems, this value is approximately 1.28 microsceconds and varies from system to system at representative values. The reason why other systems are indicated is to make it clear that the techniques to be described for making such measurements can be employed with other types of television systems apart from the system used in the United States.

The apparatus to be described will measure the front porch interval as FP designated in FIG. 1.

SYNC WIDTH

This interval is shown in FIG. 1 by the reference number SW and essentially, is the time interval between the leading edge of the sync pulse and the trailing edge of the sync pulse. This portion of the signal is sometimes referred to as the horizontal pulse base and is specified as 0.075 H±0.005 H and is approximately 4.75 microseconds. As seen from FIG. 1, the width to be measured between the leading and falling edges of the sync pulse is optimumly set to 4.7±0.1 microseconds.

SYNC TO BURST START

This is defined as the time interval between the leading edge of the horizontal sychronization pulse and the start of the color bursts and is designated in FIG. 1 as SBS. It is measured between −20 IRE units to the start of the burst signal and is approximately 0.068 H minimum or approximately 4.9 microseconds nominal. Typical duration is 5.3±0.1 usec.

SYNC TO BURST END

This time interval is shown on FIG. 1 by line SBE and is the interval between the start of the sync pulse at −20 IRE to the end of the burst signal at approximately zero IRE. This signal is conventionally expressed as being approximately 0.125 H maximum or approximately 7.8 microseconds.

As indicated, the interval time to be described will measure the sync to burst end interval from −20 IRE to the end of the burst. It is noted that the burst start and end is defined as either the first or last transistion through a burst amplitude of ±50%, (i.e. ±10 IRE).

SYNC TO VIDEO START

The interval representative of this time is shown on FIG. 1 as SVS and is measured from −20 IRE to either +4 or +10 IRE as desired. The signal is approximately 0.145 H maximum or about 9.2 microseconds.

BURST WIDTH

As is known, the composite color television system as employed in the United States specifies that a color burst signal of a frequency of 3.579545 MHz shall be located on the back porch of the horizontal blanking signal during a color transmission. The number of cycles of color bursts specified is 8 cycles as a minimum. Conventional broadcasting specifications indicate approximately 8.5 cycles of the burst frequency on the back porch of the signal.

As seen in FIG. 1, the duration of the color burst is designated as CBW. The interval timer to be described measures the number of cycles of the burst frequency between ±50% of burst amplitude and provides a digital display of the number of cycles contained.

SYNC RISE TIME

This specifies the time interval at the trailing edge of the sync pulse from 10% to 90% of its final amplitude and is designated in FIG. 1 as SRT. In the American color system, the sync rise time is approximately specified to be 0.004 H maximum or approximately 0.254 microseconds.

As will be explained, the television interval timer serves to measure this interval between 90% to 10% amplitude points which is the proper way of measuring the rise time of a video pulse.

VERTICAL BLANKING

As is known, to allow time for the scanning spot to return from the bottom of each field scan to the top, a small number of lines are arranged at the end of each field to be free of picture information. The interval occupied by these lines is known as vertical blanking. In present television systems, this interval ranges from 5% to 10% of the field scan period corresponding to blanking 13 to 41 lines per field and depending upon the number of lines in the scanning pattern.

In the American color system, the vertical blanking can be accomplished in 18.4 lines minimum to 21 lines maximum or 0.07 V to 0.08 V where V is the time interval from the beginning of one field to the beginning of the next field. As is known, the number of fields per second in the American system is 59.94. Hence, as will be explained, the television interval timer will measure or count the number of vertical blanking lines and provide a digital indication of the same.

Figure 2A:
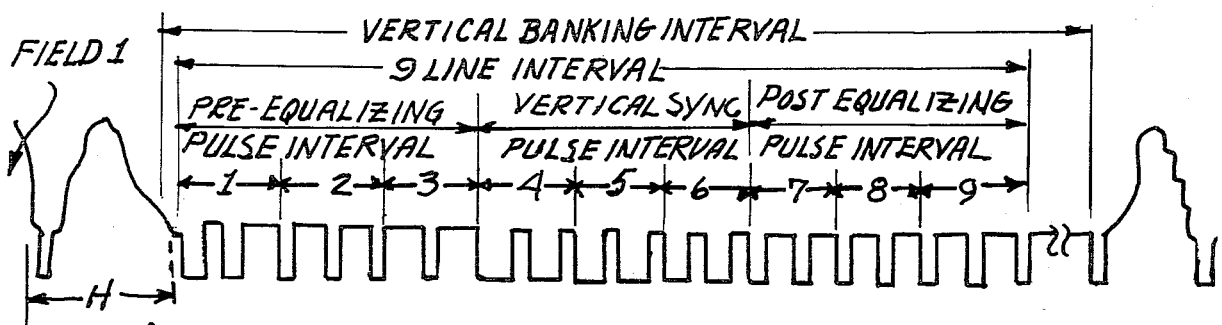
FIG. 2A is a diagram of a television field showing the vertical blanking interval.

Referring to FIG. 2A, there is shown a composite video signal for field 1 which clearly depicts the vertical blanking interval associated with the composite signal.

PICTURE START

As is known, the American color system consists of 525 lines per frame. The number of active lines per frame or the number of lines which contain information can vary between 483 and 488. Essentially, each frame contains between 20 to 40 lines which do not have picture information, but are used to transmit the synchronization information. The television interval timer measures the number of lines before the picture start or before the video information is impressed and provides a digital display of this number.

EQUALIZING PULSE WIDTH

The equalizing pulses are pulse trains in which the pulse repetition frequency is twice the line frequency and those pulses that occur before and just after a vertical sychronizing pulse. This is clearly shown in FIG. 2A as defining a preequalizing pulse interval cycle followed by a vertical sync cycle, followed by a post equalizing cycle. The equalizing pulses minimize the effect of line frequency pulses on the interlace. The width of the equalizing pulse is measured at −20 IRE units and is nominally 2.3±0.1 microseconds. The base of the pulse is nominally specified as 0.045 H while the top of the pulse is 0.004 H maximum.

Figure 2B:
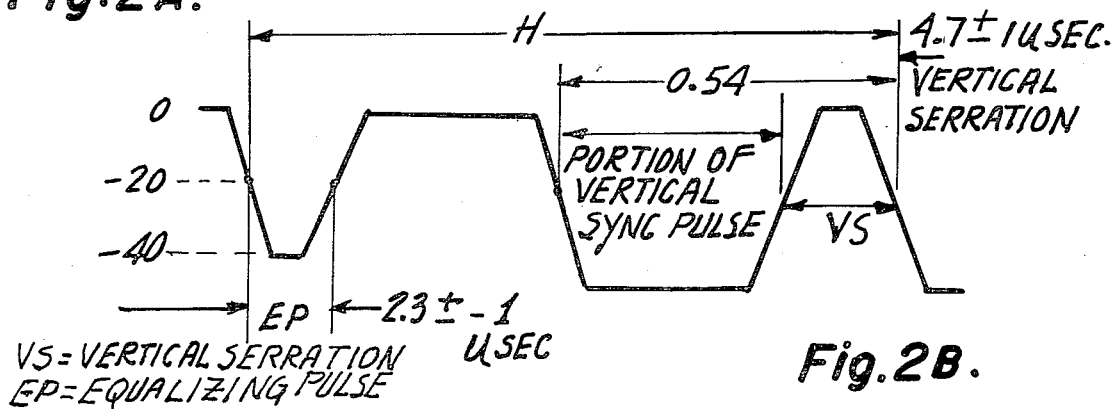
FIG. 2B is a diagram showing the equalizing and vertical pulses.

Referring to FIG. 2B, there is shown a representative equalizing pulse and the interval EP which is to be measured by the equipment to be described.

SERRATION WIDTH

Referring to FIG. 2B, the width between vertical sync pulses is referred to as the vertical serration and is nominally set at 4.7±0.1 microseconds. The serration width as indicated in FIG. 2B is measured at −20 IRE units.

BURST AMPLITUDE

As indicated in FIG. 1, the color burst signal rides on the back porch of the horizontal sync pulse. The amplitude of this signal is nominally 0.90 S to 1.1 S where S is equal to the peak to peak amplitude of the sync pulse which is shown in FIG. 1 as about 40 IRE units. Hence, for a sync amplitude of 40 IRE units, the peak to peak amplitude of the burst signal would be between 36 to 44 IRE units.

The television interval timer, as will be explained, performs a direct amplitude measurement of the peak to peak value of the burst signal and displays this as a digital indication.

SYNC AMPLITUDE

As described above, the amplitude of the sync pulse shown on the diagram as S is nominally specified as 40 IRE units peak to peak. This amplitude is also measured by the apparatus to be described and gives a direct digital display of the value in terms of IRE units.

From the above description of the parameters to be measured, it should be apparent that based on the nature of the composite signal other quantities can be accommodated and measured in regard to the timing intervals inherent in the television signal. It is, of course, understood that the parameters listed above are of prime concern to present day broadcasting stations and it is further anticipated that the F.C.C. and various other agencies will require the station to hold and maintain the above described parameters within desired tolerances. Hence, it should be apparent that the interval timer to be described has wide utility and will serve to enable the broadcaster to maintain the timing intervals and characteristics of the transmitted signal within extremely close tolerances by having the capability to rapidly perform the above described measurements.

DETAILED DESCRIPTION OF FIGURES

FIG. 3 is a simplified block diagram of the television interval timer according to this invention.

As indicated above, the television interval timer can replace the conventional waveform monitor for the measurement of timing intervals required under governmental transmission specifications, as those of the F.C.C. in the United States. All measurements are performed automatically and may be displayed individually using manual select controls and a digital display.

Each parameter to be measured is associated with a separate manual switch to enable the operator to select the parameter to be measured.

Thus, shown in FIG. 3 is a plurality of switches 1 to 15. Each switch may comprise a momentary pushbutton action and is operative to latch or set a particular flip-flop or binary multivibrator associated therewith. It is well known to supply such components as indicated or to further supply a locking switch, if desired. Hence, the operator upon selecting any one of the switches 1-15, will program the interval timer to perform the measurement selected. Each switch has an input coupled to a parameter select matrix 20. The matrix 20, which may be a conventional diode or transistor matrix, operates to receive the inputs from switches 1 to 15 and to provide at the output, a four bit binary code indicative of the parameter selected. In this manner, a four bit binary code is transmitted via the output cable or address bus 21 to control the appropriate modules of the interval timer. Essentially, the function of a matrix circuit as 20 is well known and is sometimes referred to as a concentrator or encoder. Each parameter is therefore represented by a unique binary code at the output of the address bus 21 of the selector matrix 20.

As one can ascertain, there are many suitable configurations for accommodating a plurality of input switches or parameters to provide an address bus as 21 in order to reduce the number of wires or cables to be routed. Hence, as above described each parameter to be measured is associated with a selectable switch and is represented by a unique address which is transmitted via the address bus 21 to the various modules of the interval timer as will be explained. In order to facilitate explanation and to simplify the description of operation, the following table depicts the parameter to be measured, the range of measurement provided by the interval timer, the address of the parameter as transmitted on address bus 21, the detecting level or levels and the reference numeral assigned to the parameter in FIG. 3.

As will be explained, the measurement range is the range that the interval timer can accommodate and encompass the minimum to maximum deviations which can be anticipated in a given measurement. The detecting level is that level at which the interval timer makes the measurement.

It will be apparent that both the measurement range as well as the detecting level may be varied to enable measurements of different ranges and levels as desired and according to the requirements of a particular broadcasting facility.

Thus, as indicated above the interval timer to be described enables one to select any parameter as specified in the Table I by means of the associated switch 1-15 to cause the timer to measure the parameter selected. All measurements are performed on the composite video signal as provided at the transmission or broadcasting facility.

As will be explained subsequently, the address bus 21 is routed to various modules included in the interval timer to enable such measurements.

The video input signal is applied to the input of a video buffer or video amplifier 22. Amplifier 22 is of a conventional configuration and may be referred to as an isolation or impedance matching amplifier. The video signal as applied to the input of amplifier 22 is the composite video signal which in the United States is referred to as the NTSC 525 line signal. As above indicated, the techniques to be described herein are applicable to interval measurements for other video signals as employed in systems different than the NTSC system.

The output of the video buffer circuit 22 is coupled to the input of a sync separator circuit and slot generator circuit 23, a sync amplitude measurement circuit 24, a color burst measurement circuit 25, a color burst cycle detector 26, a vertical interval detector 27, a start level detector circuit 28, and a finish level detector circuit 32.

The sync separator and slot generator circuit 23 receives the composite signal at an input and provides at its output, a timing signal which is synchronized to the composite signal. The sync separator portion of circuit 23 is of a relatively conventional design and essentially, responds to the sychronizing pulse associated with the composite signal to provide an output pulse locked or synchronized to this pulse.

In the particular circuit, the sync separator 23 includes a phased locked loop which is locked to the horizontal sychronizing pulse. The oscillator associated with the loop provides a signal output consisting of 64 pulses during one line. Each pulse is locked in phase to the horizontal sync pulse. Since the horizontal frequency is approximately 64 microseconds, the output of the sync separator and slot generator 23 consists of 64

TABLE I

| REFERENCE # | PARAMETER | ADDRESS | MESUREMENT RANGE | DETECTING LEVEL(S) |
|---|---|---|---|---|
| 1 | HORIZONTAL BLANKING (HB) | 0001 | 9.8–18.0 us | +4 IRE |
| 2 | PICTURE BLANKING (PB) | 0010 | 9.8–18.0 us | +10 or +20 IRE |
| 3 | FRONT PORCH (FP) | 0011 | 0.1–4.0 us | +4 or +20 IRE to −20 IRE |
| 4 | SYNC WIDTH (SW) | 0100 | 3.0–5.6 us | −20 IRE |
| 5 | SYNC TO BURST START (SBS) | 0101 | 3.0–5.6 us | −20 IRE to start of burst |
| 6 | SYNC TO BURST END (SBE) | 0110 | 7.2–8.5 us | −20 IRE to burst end |
| 7 | SYNC TO VIDEO START (SVS) | 0111 | 9.0–14.0 us | −20 IRE to +4 or +20 IRE |
| 8 | BURST WIDTH (BW) | 1000 | 5.5–10.5 cycles | ±50% B.A. |
| 9 | SYNC RISE TIME (SRT) | 1001 | .05–4 us | 90% to 10% S |
| 10 | VERTICAL BLANKING (VB) | 1010 | 17–40 lines | +12.5 or +20 IRE |
| 11 | PICTURE START (PS) | 1011 | 20–40 lines | +12.5 or +20 IRE |
| 12 | EQUALIZING PULSE WIDTH (EP) | 1100 | 1.5–3.5 us | −20 IRE |
| 13 | SERRATION WIDTH (VS) | 1101 | 3.3–5.6 us | −20 IRE |
| 14 | BURST AMPLITUDE (BA) | 1110 | 20–60 IRE | pK to pK |
| 15 | SYNC AMPLITUDE (S) | 1111 | 20–60 IRE | pK to pK | pulses per television line, each spaced one from the other at one microsecond.

The output of the sync separator and slot generator 23 is applied to one input of a slot gating control and pulse routing circuit 30. Another input to the circuit 30 is obtained from the address bus 21. The function of the slot gating control and pulse routing circuit 30 is to develop timing signals for controlling the particular measurement of the parameter whose address is impressed on the bus 21. The control and routing circuit 30 functions to provide suitable gating signals by operating on the 64 microsecond pulse train applied thereto from the slot generator 23. The nature of the particular signal is determined by the address coupled to the control and routing circuit 30 via bus 21.

The particular gating waveforem as developed by the control and routing circuit 30 is applied via associated outputs to an input of the start level detector 31 and to an input to the finish level detector 32.

The outputs of the start level detector 31 and the finish level detector 32 are applied to a start/finish latch circuit 33. As will be explained, the start/finish latch circuit 33 controls the interval during which a multistage binary counter 35 is allowed to accumulate a count. As will be explained, the count accumulated by the counter 35 is indicative of the duration or the magnitude of the parameter selected.

The counter 35, in this case, is a six digit binary counter operating under control of the start/finish latch 33 and counting transistions obtained from a frequency standard or crystal oscillator source 36. The source 36 as crystal controlled is extremely stable and as will be explained, operates at a frequency of 100 MHz to provide proper resolution for the measurements to be performed.

The outputs of the counter 35 are coupled to a digit selector module 37. The function of module 37 is to enable one to display either the four most significant digits (4MSD) of the count or the four least significant digits (4LSD) of the count.

The output of the digit selector module 37 is applied to a four bit comparator and latch circuit 38. The function of circuit 38 is to store the last four bits of the counter 35 as selected by the digit select circuit 37. The bits, as will be explained, are compared in circuit 38 with the four bits last stored and the comparator operates to store and retain the smaller value. The output of the comparator and latch 38 is applied to an output storage latch 39, where the digits to be displayed are stored.

The output of the latch circuit 39 is coupled to a digital display module 40 where the stored digits are displayed directly in digital form. It is apparent that the output of module 39 could be directed to a printer or other display to give one a direct readout of the magnitude of the parameter which has been selected for measurement.

As will be described, the digit select module 37 and the comparator and latch circuits 38, 39 and 40 operate under control of arithmetic control module 41. The control module 41 has one input coupled to the address bus 21 for specifying the control factor to be accorded to the selected parameter. Another input is supplied from the control and routing circuit 30 to enable display activation upon completion of the measurement.

As will be described, the interval timer performs measurements for multiple television lines to determine the representative value of the parameter. In this case, the interval timer performs measurements of certain parameters on a television line to line basis and provides a reading indicative of the representative value of the measured parameter over a plurality of television lines.

Thus, in the interval timer to be described, certain parameters are measured over 100 television lines and the result displayed. Other parameters are sampled one thousand times and the result displayed. Accordingly, one can achieve extremely high resolution in regard to the measured parameter, while further assuring that the displayed value is well within allowable tolerances. For most time interval parameters, the reading uncertainty maintained on video signals with a signal to noise ratio of greater than 50db is about 20 nanoseconds with a resolution of 10 nanoseconds.

In regard to Table I, the parameters which are listed under reference numerals 4,5,6,9,10,11,12 and 13 are measured with such accuracy. Parameters 1,2,3 and 7 or horizontal blanking (HB), picture blanking (PB), front porch (FP), and sync to video start (SVS) are accomplished at a sample rate of 1,000 lines, but the accuracy specified above is applicable.

Parameter 8 or burst width (BW) is measured and displayed in number of cycles and is accurate to plus or minus one-half cycle.

Parameters 10 and 11, vertical blanking and picture start are measured and displayed in number of television lines and are read to ±0.5 line with a resolution of ±0.1 line.

Parameters 14 and 15 or burst amplitude (BA) and sync amplitude (S) are measured and displayed in IRE units and are read to ±0.5 IRE with a resolution of ±0.1 IRE.

As previously described in regard to Table I, each parameter is also measured between standard or preselected levels indicative of the parameter tolerance. Hence, the measurement of each parameter specifies the detecting level or levels between which the time interval is to be measured.

Accordingly, the start level detector 31 and the finish level detector 32 has coupled to an input thereof, an output from a detector level selector module 42. Module 42 has an input coupled to the address bus 21. Hence, for each parameter selected, module 42 programs the level at which the measurement is to take place into the level detectors 31 and 32. Thus, one is assured that the timing interval displayed is obtained between the correct amplitude levels for that parameter.

It is now noted that parameters 4,5,6,9,10,11,12 and 13 of Table I are measured on a line to line basis and are sampled and displayed for 100 television lines.

Parameters 1,2 and 3 are measured on a line to line basis, but based on 1,000 television lines.

Parameter 7 or sync to video start is also measured on a line to line basis, but also based on 1,000 lines.

Parameters 14 and 15 are directly measured and averaged over 100 lines, but the measurements relate to amplitude and not time intervals.

Hence, the sync amplitude measurement circuit 24 operates to perform measurements of the sync amplitude by means of a sample and hold circuit controlled in time by a suitable gate derived from the control and routing circuit 30. The sync is measured with respect to the blanking level shown in FIG. 1 at 7.5 IRE units. The analog voltage obtained is converted to a digital signal by means of the A-D convertor 50 coupled to the output of the sync amplitude measuring circuit 24.

The A-D convertor 50 is coupled to the address bus 21 for selecting the same for either the sync amplitude measurement or the color burst measurement.

The output of the A-D convertor 50 is coupled to the counter module 35 where it forces the counter to correctly indicate amplitude in IRE units.

Similarly, the peak to peak value of the burst (parameter 14) is measured by a color burst measurement circuit 25. The color burst circuit 25 is also a sample and hold peak detector operated under control of a suitable timing slot generated by module 30. This output is also applied to the analog to digital convertor (AD) 50 and thence to the counter module 35.

Also shown is the color burst cycle detector 26 which is employed to measure the number cycles of color burst (parameter 8). The level at which the measurement is made is controlled by an automatic gain control (AGC) signal obtained from circuit 25. The time slot for color burst width is developed by the slot generator 30. The output of the color burst detector is applied directly to the counter 35 to cause it to read the number of cycles of burst during the mode selected by parameter switch 8.

The vertical interval detector 27 enables the measurement of vertical blanking (parameter 10) and picture start (parameter 11) by responding to the vertical sync pulse interval. The output of the interval detector, as will be explained, is coupled directly to the counter module 35 and causes the same to display the measurements of parameters 10 and 11 in terms of television lines as specified in Table I.

Also depicted in FIG. 3 is detector 60 indicated as Finish on color burst detector. The detector 60 has an output coupled to the start-stop latch circuit 33. The function of the detector 60 is to allow one to accurately measure SBS (parameter 5) and SBE (parameter 6) by assuring that the latch will be turned off always at the start or finish of the color burst. In this manner, the integrity of the measurement can be maintained.

Also shown in FIG. 3 is a module 70 labelled Remote Parameter Select. As is apparent to those skilled in the art, one can select each parameter as specified in Table I by remote means. Hence, one can directly place the correct binary address of the parameter to be measured on the address bus 21 and therefore circumvent the selector switches. Such operation is easily understood by those skilled in the art. It is important to note that by the use of the address bus 21, one can easily and simply provide remote programming of the interval timer and hence, control operation of the measurements from any one of a desired plurality of locations. The remote control and programming of digital equipment is well known and many alternatives for remote parameter selection can be implemented and employed in module 70.

In order to fully understand the nature of operation of the interval timer depicted in block form in FIG. 3, the measurement of the following parameters will be described. Reference will be had to the timing waveforms generated by the slot gating control and pulse routing circuit 30 to clearly indicate how the proper count is generated in counter 35 and thereafter processed to enable an accurate and reliable display of the parameter value. Where similar procedures are employed, mention will be made of the similarities and the differences in regard to timing waveforms and detecting levels will be specified.

Referring to FIG. 4, there is shown a block diagram of the SLOT generator which is included in module 23 of FIG. 3 and the SLOT GATE CONTROL AND PULSE ROUTING module 30 shown in FIG. 3.

It is noted that module 23 of FIG. 3 contains a sync separator which is well known in the television art and many examples of such separators to derive the composite sync signal from the video signal are well known both in the receiver and transmitter art and hence, to avoid complications, such well known components are generally alluded to.

The composite sync signal as generated in module 23 is applied to a phase locked loop containing a controlled oscillator 100. The oscillator 100 forms part of the loop and is locked to the horizontal sync pulse, but operates to provide 64 pulses for each television line or 64 pulses which are synchronized to the horizontal sync pulse.

The output of the oscillator 100 is applied to a counter 101, which operates to divide the output frequency by a factor of 64. Hence, counter 101 can be implemented as a multiple stage binary counter to perform a division by 64. The output of counter 64 is fed back to a phase detector wherein the horizontal sync pulse as derived from the sync signal is compared with the oscillator output as divided to produce an error signal for accurately synchronizing the oscillator 100. Hence, the output of the oscillator 100 is locked both in phase and frequency to the horizontal sync pulse and provides 64 pulses for each television line.

The output of divider 101 is also applied to a slot decoder (H/64) circuit 102. Essentially, the decoder 102 comprises a series of gates, which decode the various states of counter 101 to provide outputs indicative of any one or any group of those 64 pulses for each television line.

Based upon conventional television standards, it is known that the active portion of a television line will occur from pulse eleven to pulse sixty-three with the 64 pulse "graticule" generated by oscillator 100. The 64 pulses generated during each line is referred to as a "graticule" as they are an accurate indication or a marking (as on a ruler) as to where the information content for each line is to be measured. Hence, the active portion of the television line occurs between pulse 13 and pulse 63 and the pulses representative of pulse 13 to pulse 63 are decoded and gated out via the decoder 103 designated as decode 13—63.

Thus, fifty pulses (13 to 63) are gated out via decoder 103 and are applied to a divider 104. Divider 104 is a divide by five circuit, which may comprise a binary divider with feedback and the output of divider 104 serves to divide the fifty pulses representative of active line information by five to provide an output of ten pulses per active line and designated as 0.1 active line pulses. Basically, the output of counter 104 provides ten pulses during the active line period occuring between pulses 13 to 63.

Thus, as explained above, the 64 pulses per line serve to divide the television line in time increments and information contained within the line can be accessed by controlled gating during the proper increment or increments.

Accordingly, shown coupled to the slot detector 102 are a series of other decode gates as 120 to 128. These gates operate during line measurements to allow television line information or that information occurring on a line to line basis to be measured. The gates 120 to 128 are further enabled by a line measurement gate (from line 36 to 244) coupled to an input of each gate via the lead 130.

The outputs of gates 120 to 123 are further directed to input of AND gates 131 to 139. Another input for these gates is derived from the address decode PROM 140.

As explained in FIG. 3, each function to be measured (1 to 15) has a unique address. The decode PROM which is a programmable read only memory is set to decode the address generated and hence, to activate the proper AND gate as 131 to 139 to enable the slot generator depicted in FIG. 4 to transmit the proper timing pulses. Gate 124 is also accessed by an output of the address decoder 140 to enable the gate to operate on either a line or field basis, as will be further explained.

The outputs of AND gates 131 to 134 are further applied to an input of OR gates 141 to 144 to enable dual operation for alternate measurements. The output and function generated by each decoder 120 to 128 and associated gates will be given below.

DECODE 120—This gate decodes pulses 7 to 9. Its output is applied to AND gate 136. AND gate 136 receives an input from the address decode PROM 140 during a color burst measurement. The output of AND gate 136 is designated as the color burst finish enable and determines when the color burst measurements are to be terminated.

DECODE 121—This gate decodes pulses 25 to 37 of the 64 pulse reference generated by decoder 102. The output of decode 121 is applied to the inputs of AND gates 138 and 139. AND gate 138 receives one other input designated as enable equalizing pulse measurement. The output of gate 138 is applied to OR gates 142 and 143 to enable measurement of equalizing pulses. AND gate 139 receives one other input designated as enable serration width measurement. The output of gate 139 is applied to OR gates 141 and 144 to enable a proper measurement of serration width. Gates 138 and 139 also receive an input from the PROM 140.

DECODE 122—This gate decodes pulses 5 to 9. The output is applied to AND gates 135 and 137. Each gate 135 and 137 is accessed by the decode PROM 140 during a color burst measurement. Gate 135 provides at an output, a signal entitled as color burst start enable. Gate 137 provides at an output, a signal entitled as color burst count enable. Hence, gate 135 provides a pulse to allow the finish of the measurement of sync to burst start. Gate 137 allows the counter to count the burst cycles. The gate 136 allows the finish of the measurement of sync to burst end. Decode 122 serves to disable the decode gate 123 during the color burst period (5 to 9 pulse).

DECODE 123—This gate operates to decode pulses 59 to 14 for leading edge measurements as for the leading edge of blanking or sync. For trailing edge measurements, the gate decodes pulses 3 to 14. The decode 123 receives an input from the PROM 140 to enable the alternate decoding for the leading or trailing edge as determined by the nature of the measurement programmed in via the parameter address bus. The output of the decode 123 is directed to AND gates 131 to 134. Each AND gate 131 to 134 receives an additional input from the address decode PROM 140. The outputs of AND gates 131 to 134 are respectively coupled to one OR gate input 141 to 144. The other inputs to OR gates 141 to 144 are derived from AND gates 138 and 139 as above described. The function of the OR gates 141 to 144 are as follows:

OR gate 141 provides a signal designated as +Ve start enable which basically activates the start/finish latch (33 of FIG. 3) positive transistion measurement. Gate 142 provides a signal designated as −Ve start enable which activates the start/finish latch for a negative transition measurement. Gate 143 provides a signal designated as +Ve finish enable which inactivates the start/finish latch for a positive finish transition, while gate 144 activates the latch for a negative finish transition. Hence, the OR gates 141 to 144 determine the start and finish of the measurement during the appropriate pulse interval as controlled by decoder 123, as 59 to 14 for leading edge measurements or 3 to 14 for trailing edge measurements. The decode 123, as indicated, is inhibited during the color burst occurring for pulses 5 to 9 via decode 122.

DECODE 124—This decoder decodes pulse 39 on a line to line basis and decodes line 36 on a field basis. The decode gate 124 receives an input from the PROM 140 indicative of a line or field measurement. The output of the decode 124 is indicated as reading valid to ALU. This module (ALU) is the arithmetic control module 41 or arithmetic logic unit of FIG. 3. Hence, the output of decode 124 specifies that the measurement stored in the counter and decoded is a valid measurement and can be further operated on as explained above.

DECODE 125—This decode gate decodes the 38 pulse and provides an output signal which forces the counter (35 of FIG. 3) to terminate the count. Hence, at the end of pulse 38, the counter should have the correct count indicative of the measurement made stored therein.

DECODE 126—This gate decodes pulses 6 to 7 to provide a gate to enable the color burst amplitude measurement. This is an analog measurement as explained above, and the amplitude of the burst is measured during pulses 6 and 7.

DECODE 127—This gate decodes pulses 2 and 3 to enable measurement of the sync pulse amplitude. This is also an analog measurement.

DECODE 128—This gate decodes pulses 8 and 9 to provide a gate for the black clamp level to enable setting of a reference level for the interval timer.

Hence, as described above, the slot generator and slot gate control and pulse routing as shown in FIG. 4 develops 64 pulses for each television line. These pulses are decoded according to their position and in regard to the information content of the line to thereby generate a plurality of timing gates to enable the measurement of the various parameters depicted in Table I and shown in FIG. 3. The generator and gate control assures that the measurements are made according to the proper transitions as a positive or negative transition by further generating control signals for the start and finish operation of the start/finish latch (33 of FIG. 3). Hence, all timing and measurement is controlled by the actual sync pulse generated by the television studio and based upon the division of that pulse into a predetermined number of smaller increments (64), one can then measure the sync and information content of the video signal generated to determine whether the specifications as required by the authorities are in compliance or within the allowable tolerances.

Referring to FIG. 5, there is shown a block diagram of the BCD counter (35 of FIG. 3), the start level and finish level detectors (31 and 32 of FIG. 3), the start/finish latch (33 of FIG. 3), the detect level selector (42 of FIG. 3) and other associated components to be described.

Essentially, as indicated above, a counter 200 (35 of FIG. 3) is a binary coded decimal counter and consists, by way of example, of six cascaded decade counters designated as 201 to 206 respectively. Many counter configurations are known and are available in the prior art as integrated circuit modules and so on. The counter 200 receives a clock input from an accurate frequency source 210, which may be a crystal controlled oscillator. The source 210 is specified to provide at its output, a frequency of 100 MHz or $10^8$ pulses per second.

In a first mode, the counter is controlled in operation by a start/finish latch 211 (33 of FIG. 3). The output of the latch 211 is coupled to the input stage 201 of counter 200 and effectively allows the counter to commence counting when the latch is in the START condition and to cease counting when the latch is in the FINISH condition. Hence, as can be seen, the latch 211 may be a flip/flop or switching circuit capable of exhibiting two stable states, one state indicative of the START operation or condition and the other indicative of the FINISH operation or condition.

The latch 211 is controlled between the start and finish states by a start level detector or comparator 212 and a finish level detector or comparator 213. The comparators comprise operational amplifier circuits as 214 and 215 for comparator 212. The outputs of the operational amplifiers 214 and 215 are coupled together and directed to the set input of the start/finish latch 211.

The AND gate 240 provides at an output the signal designated as clear when video is greater than reference level. This signal is used to reset the counter 200 during preblanking to allow for program content. The reason for this is to allow for a true measurement of picture blanking. This operation is depicted in FIG. 10C and thus this prevents the counter from accumulating a false count.

The comparator 212 receives the +Ve start enable signal from OR gate 141 of FIG. 4 as a first input to amplifier 214. Comparator 212 also receives the −Ve start enable signal from OR gate 142 of FIG. 4 as a first input to the amplifier 215. The amplifiers 214 and 215 receive a black reference clamp level signal at their other inputs. Basically, this signal is derived from the input video signal via amplifier 220 and the 12 MHz filter 221.

Amplifier 222 is a clamping device and receives the black level clamp gate from decode 127 of FIG. 4. The output of clamp 222 is the black reference level, about which level measurements are referenced to. Each comparator amplifier as 214 and 215 receives a specific reference level from the start reference selector 223.

Basically, generator 223 receives at its input, IRE reference levels. The reference selector 223 has another set of inputs coupled to an address decoder PROM 225. In this manner, the generator 223 provides a particular IRE level to the start comparator 221 as a function of the parameter to be counted or measured. As such, the selector 223 may be a gate matrix or decode wherein each address from the PROM 225 causes the appropriate IRE level to be applied to the comparator 212. The comparator 212 then operates to compare the IRE reference level with the level obtained from the video signal via the black level clamp 222. If the level of the video signal is greater than the IRE reference level during the +Ve and −Ve start enable signals, the comparator 212 activates the latch 211 to allow the counter to start.

The finish comparator 213 is of the same configuration as comparator 212 and receives the +Ve finish enable signal from OR gate 143 of FIG. 4 and the −Ve finish enable signal from OR gate 144 of FIG. 4. A finish reference selector 226 also receives the IRE reference levels at one series of inputs and the address information from the PROM 225. Hence, the finish reference selector 226 supplies the finish detector or comparator 213 with the proper reference levels. The finish comparator 213 operates to compare the IRE reference level with the video level to provide a finish signal to the latch 211 when the video signal is equal to or greater than the reference level.

The IRE reference signals as applied to the start and finish reference selectors 223 and 226 are generated in a reference level amplifier 227. Amplifier 227 receives the sync amplitude measurement as measured by the sync amplitude measuring circuit of block 24 of FIG. 3. The sync pulse amplitude is used to develop the standard IRE reference levels which are then used with comparators 212 and 213 to assure that the timing intervals to be measured are done so at the correct levels. In this manner, the user is sure that not only are the timing characteristics correct or proper, but that the levels at which the measurements are made is proper.

A further comparator 230 is shown, which as comparators 212 and 213, operates for providing measurements about the color burst signal, such as the measurement of sync to burst start (SBS) and sync to burst end (SBE). The start/stop latch 211 will be turned off always at the start or finish of the color burst in order to perform these measurements accurately. Hence, the comparator 230 assures this operation. One input to the comparator 230 is the color burst start enable signal from AND gate 135. Another input is the color burst finish enable signal from AND gate 136. The comparator amplifiers, during the burst associated measurements receive an input designated as detected color burst. This signal (from video signal) is used as a reference when burst related measurements are made. Hence, the latch 211 is controlled by comparator 230 to cause the counter to respond to the start or finish of the burst when burst related measurements are implemented.

The counter 200 is further forced to finish on line measurements by the force counter to finish gate generated by decode 125 of FIG. 4. This input is applied to latch 211 to assure that the count is stopped during the pulse 38, as above described.

A start disable latch 219 is shown. The latch 219 prevents the counter 200 from performing two readings on a single line. The latch 219 receives a set input from the comparator 212 or 214 which is set on an average measurement. If the measurement is a minimum, the latch 219 is set from decode 311/64 from 127 of FIG. 4. Latch 219 is reset to allow its "start enable" condition during the force counter to finish signal. Hence, whenever a valid start is detected, the latch 219 allows the counter to perform one measurement, as will be shown in the timing waveforms.

The above described operation as shown in FIG. 5 depicts the counter control for most of the timing intervals as shown in Table I.

Figure 6B:
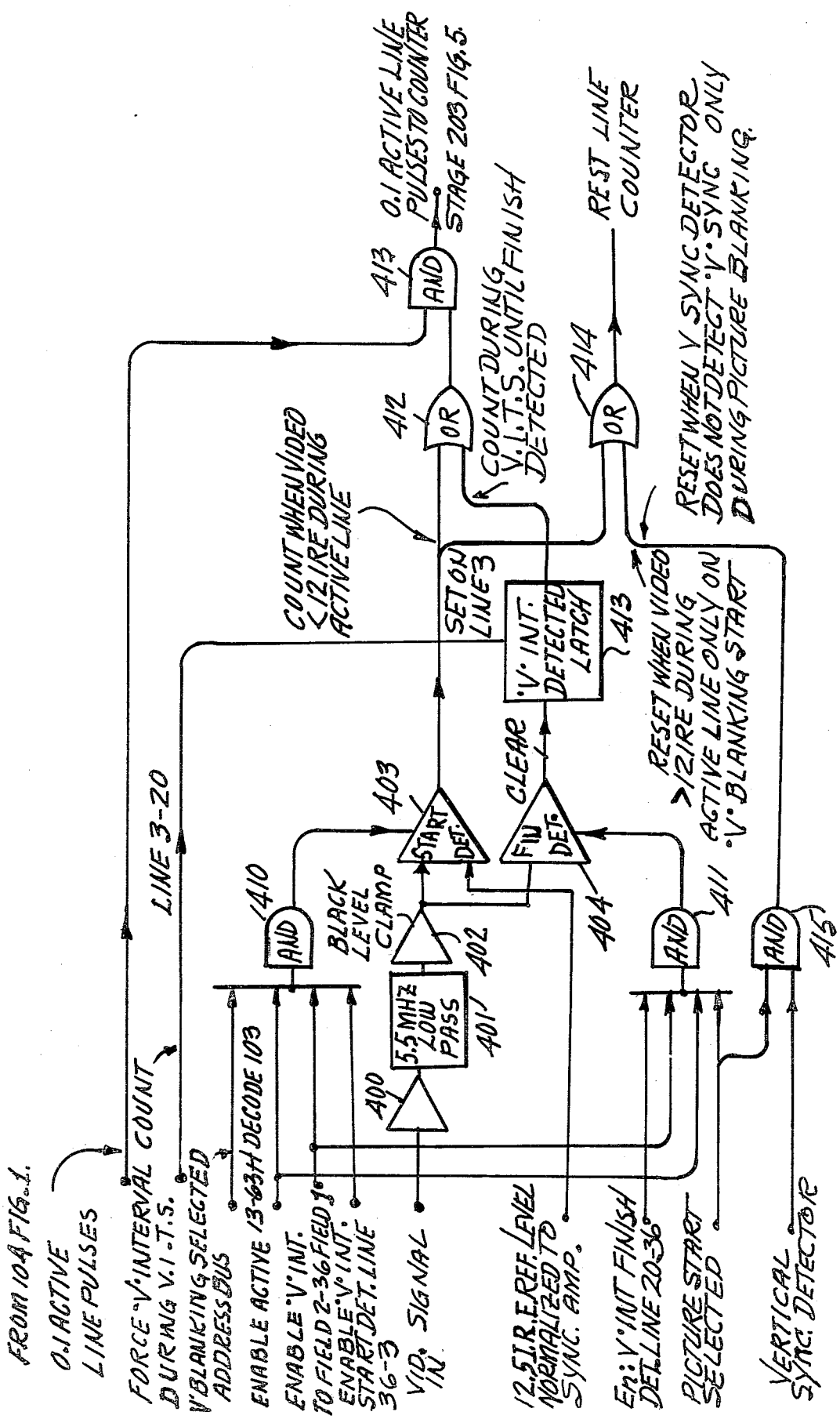

During the vertical interval, the counter 200 is supplied with 0.1 active line pulses which are generated in a vertical interval detector; which detector employs the 0.1 active line pulse waveform generated by divider 104 of FIG. 4. The gating waveforms depicted of FIG. 4 as the enable equalizing pulse applied to AND gate 138, the enable serration width gate as applied to AND gate 139, and the enable line measurement as applied to decoders 129 and 128 via line 130, are also generated in the vertical interval detector, as will now be described in conjunction with FIGS. 6A and 6B. The vertical interval detector is shown in FIG. 3 as module 27 and FIGS. 6A and 6B are a detailed block diagram of the assembly.

The composite sync signal as that signal from module 23 of FIG. 3 and the same signal as is applied to the phase locked oscillator loop 100 of FIG. 4, is applied to a vertical sync detector 300. The vertical sync detector 300 is also a well known configuration and many circuits are known in the prior art to enable detection of the vertical sync associated with a video signal.

The composite sync signal is also applied to an input of a down counter 301, which is preset to the binary number equivalent to 13. This down counter 301 is allowed to count when the vertical sync is detected. It thus counts down from 13 each time vertical sync is detected. In this manner, the counter 301 detects the start of a new field interval and counts down for each sync pulse from 13 to 0.

A decoder 302 which again is an AND gate configuration, decodes the 11 and 10 counts of the down counter 301 to provide at its output the enable equalizing pulse measure gate for lines 2 and 9 of each field. This gate is applied to the input of AND gate 138 of FIG. 4 to thus cause OR gates 142 and 143 to develop the proper signals during vertical interval measurements. A further decoder 303 decodes the 5 and 4 counts of down counter 301 and this output is the enable serration width measurement gate occurring during line 5 and applied to the AND gate 139 of FIG. 4, thus allowing OR gates 141 and 144 to provide the correct signals during serration and equalizing pulse.

A further decoder 304 decodes the counts of counter 301 indicative of line 3 in field 2. This is therefore the field identifying pulse which is the output of gate 304. The start of field 2 is characterized by a half line between the first pre-equalizing pulse and the preceding H sync pulse. Hence, decode gate 304 receives the composite sync signal as well as decoding count 7 of counter 301 to identify the second field.

Upon detection of field 2, gate 304 activates the vertical interval enable latch 305 ("V" interval enable latch). This latch 305 also receives an input from the active field latch 310 for line 36. Hence, the output of the latch 305 provides a gate to enable the vertical interval measurement from line 36 of field 2 to line 36 of field 1.

As indicated, the decoder 304 receives an input from the down counter 301 indicative of the down count of seven.

Referring to FIG. 2A, it is seen that the down counter 301, when counting down from thirteen as controlled by the vertical sync pulse, reaches a count of seven and this defines the start of the vertical sync interval. As one can ascertain, the start of the vertical sync pulse interval occurs at the beginning of line one for field one and for the previous half line in field two. As soon as the count of seven is detected in counter 30, the V.I.T.S and V.I.R.S. latch 312 is set. Basically, broadcasters place a V.I.T.S. or V.I.R.S. signal on lines 17 to 24. These signals are vertical interval timing or reference signals and can be used by the Broadcaster for in program testing and control.

One must still be able to count or respond during the presence of these signals when performing vertical interval measurements. Hence, the latch 312 loads another down counter 311 when it is set by the count of seven. Counter 311 is selectively preset to count down from any count between 18 and 24 by means of the switch 314. The count is preset to depend upon the requirements of the broadcaster. Hence, the latch 312 loads or starts the down counter 311 at the end of the count or when the down counter counts down to "zero", the latch 312 is reset. Hence, the latch 312 provides an output which is a gate operative to force the vertical interval counter to count during the V.I.T.S. and V.I.R.S. signals which occurs from line 3 to line 20.

When the down counter 311 reaches the count of zero, this is indicative of television line 20 and a latch 320 designated as the V interval finish latch is set. This latch 320 is reset on line 36 by means of down counter 321. This down counter 321 is started by the decoding of count 7 (line 3) from down counter 301 and is preset to 16. Hence, it counts down to line 36. The latch 320 sets the active field latch 310 and the vertical interval start latch 330.

A further down counter 331 is also started on line 3 and is preset to count down by 13. This clears the active field latch on line 244 corresponding to counting down to 13 by down counter 331.

The vertical interval start latch 330 operates from line 36 to line 3, while the active field latch 310 operates from line 36 to line 244.

Referring to FIG. 6B, the remainder of the vertical interval detector and the means for controlling the counter 200 of FIG. 5 is shown. The video signal is applied to amplifier 400, then to a lowpass filter 401 to a black level clamp 402. This input goes to a start detector 403 and finish detector 404, which basically are comparators and are similar in operation to units 212 and 213 shown in FIG. 5.

A reference signal which is $12\frac{1}{2}$ IRE units is applied to the inputs of comparators 403 and 404. The reference signal is again normalized to the video sync and hence, a $12\frac{1}{2}$ IRE signal is developed as the signals emanating from module 227 of FIG. 5.

The start and finish detectors 403 and 404 are controlled by respective AND gates 410 and 411. The input to AND gate 410 is as follows:

One input is referred to as 'V' blanking selected which is derived from the parameter address bus and is positive whenever vertical blanking is selected. The next input is an enable active line (13 to 63 H). This input comes from the decode gate 103 of FIG. 4. The next input is the enable vertical interval measurement which is the output of the latch 305. Another input is enable vertical interval start which is the output of latch 330. Hence, the start detector will operate when all inputs at AND gate 410 are positive.

The AND gate 411 receives the enable active line signal and the enable vertical interval signal and also receives the enable vertical interval finish signal from the latch 320 and the picture start select signal which is also decoded and derived from the address bus. Hence, the finish detector 404 will operate when all signals at the input to AND gate 411 are positive.

The output of the start detector 403 goes to an OR gate 412. The output of the finish detector 404 goes to a latch 413, which basically is set on line 3 by the force vertical interval count generated from latch 312. In this manner, the latch 413 is set during the presence of the signal occurring during lines 3 to 20 to enable the counter to continue counting during the presence of the V.I.T.S. signal. The output of the latch 413 goes to OR gate 412 to thereby enable the above described operation.

The output of OR gate 412 goes to an AND gate 413, which has another input derived from 0.1 active line pulses developed by module 104 of FIG. 4. Hence, the output of gate 413 goes to the counter stage 203 to enable the binary counter 200 to count active line pulses during a vertical measurement.

Also shown is a reset gate 414. The gate 414 receives one input from the start detector and serves to reset the counter when the video signal is greater than the IRE reference level during the active line, but only at the start of the vertical blanking interval. The other input to gate 414 is derived from AND gate 415. AND gate 415 receives one input from the vertical sync detector and one input from the picture start. The AND gate provides an output when the vertical sync detector does not detect vertical sync only during picture blanking. The output of gate 414 is applied to the reset OR gate 500 shown in FIG. 5 to reset the line counter as indicated.

Thus, as can be seen in regard to the above noted description, the vertical interval measurements are made by the vertical interval detector as described in conjunction with FIG. 6 and the output of the detector is applied directly to the counter 200 via gate 413 for vertical measurements.

Figure 7:
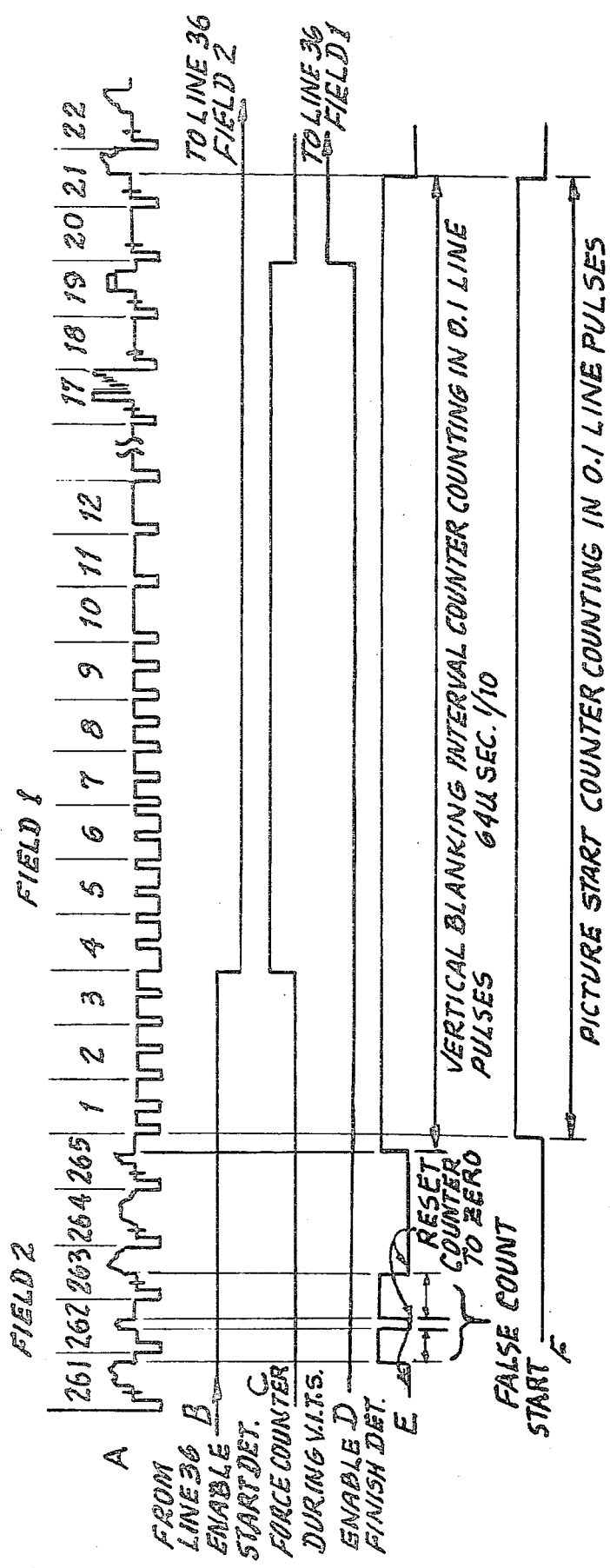
FIG. 7 is a timing diagram of a vertical interval measurement.

Referring to FIG. 7, there is shown a vertical interval timing diagram to enable one to clearly understand the operation of the vertical interval detector. The top FIG. 7A shows a typical video waveform showing field 2, lines 261 to 265 and field 1, lines 1 to 22, for example. FIG. 7B shows the waveform generated by the enable start detector gate 410 of FIG. 6B. FIG. 7C shows the waveform generated by latch 312. FIG. 7D shows the waveform generated by gate 411. FIG. 7E shows the waveform generated by gate 412 for the vertical blanking measurement. It is noted that during the vertical blanking interval as shown in FIG. 7E, the counter 200 is counting active line pulses. FIG. 7F shows the enabling waveform via gate 412 during the measurement of picture start, where again the counter is again counting active line pulses as accommodated by gate 413 of FIG. 6B.

Again referring to FIG. 7E, it is noticed that the counter starts to count and is reset before the actual vertical blanking interval. The reset occurs due to gate 414 which will reset the counter when the video signal is greater than the IRE reference during the active line and only on start of vertical blanking.

The gate 414 will also reset the counter when the vertical sync detector does not detect vertical sync during a picture blanking measurement.

Figure 8:
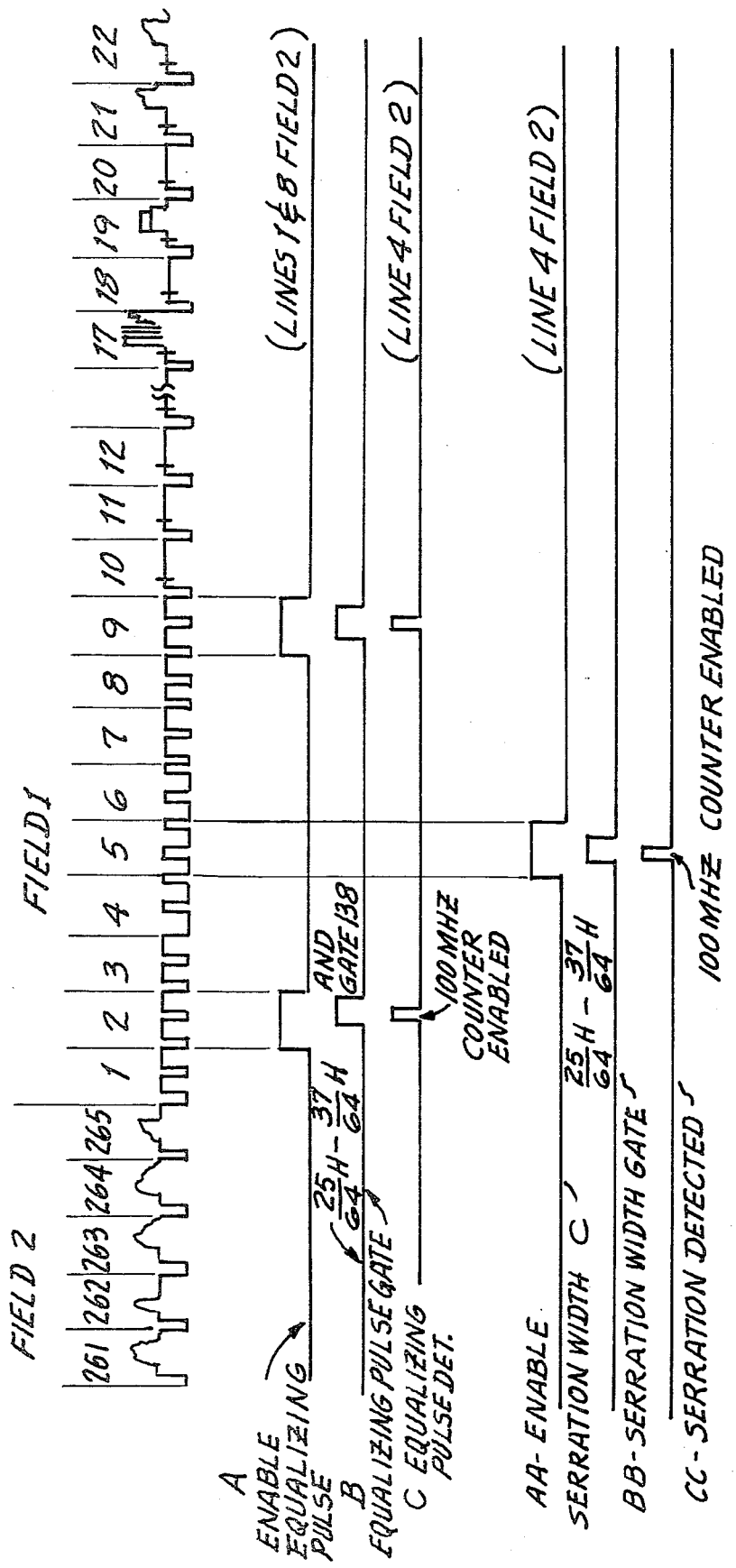
FIG. 8 is a timing diagram showing equalizing pulse and serration width measurement.

Referring to FIG. 8, there is shown timing waveforms relating to the measurement of the equalizing pulse interval and the serration width. FIG. 8A shows the enable equalizing pulse which is generated by the decode 302 in the vertical interval detector. FIG. 8B shows the equalizing pulse gate which is the output of AND gate 138 of FIG. 4. FIG. 8C shows the output of the start and finish latch 211 of FIG. 5. Hence, it can be seen that the counter is forced to count during the period shown in FIG. 8C at the 100 MHz rate.

Referring to FIG. 8AA, there is shown the serration width gate which is generated by the decode 303 of FIG. 6. FIG. 8BB shows the serration width gate which is generated by AND gate 139 of FIG. 4, while FIG. 8CC shows the output of the start/finish latch 211 during a serration width measurement.

Hence, it can be seen from FIGS. 7 and 8 how vertical blanking, picture start, equalizing pulse width, and serration width are measured by the apparatus as well as the timing diagrams necessary to provide such measurements.

Figure 9:
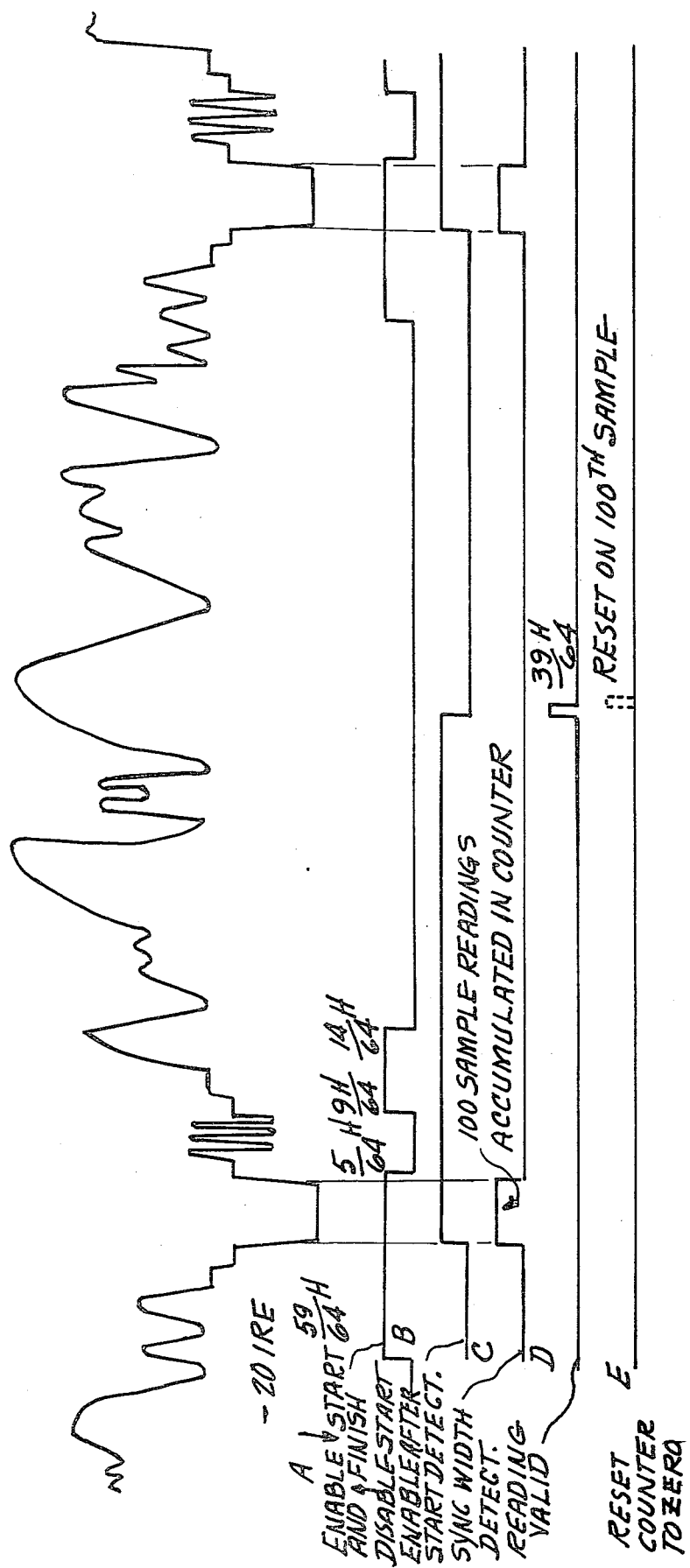
FIG. 9 is a timing diagram showing an example of an average measurement as sync width.

Referring to FIG. 9, there is shown an example of an average measurement. The measurement selected in FIG. 9 is the measurement of the sync width which is indicated as parameter 4 on Table I.

FIG. 9A shows the waveform produced at the output of gate 142 of FIG. 4 and the output of gate 143 of FIG. 4. In the FIGURE, the arrow pointing downward specifies a negative transistion while the arrow pointing upward specifies a postive transistion. Hence, the waveform shown in FIG. 9A is the composite of the −Ve start enable and the +Ve finish enable as generated by OR gates 142 and 143 of FIG. 4 and as applied to the comparators 212 and 213 of FIG. 5 to control the start/finish latch 211 and therefore the counter 200.

FIG. 9B shows the waveform produced by the latch 219, which as indicated, detects the start and allows valid counting. FIG. 9C shows the output of the start/finish latch 211. This again shows that the samples at 100 MHz are applied to the counter during this measurement. FIG. 9D shows the output from decode 124 of FIG. 4. As indicated, this pulse which is generated during the 39th pulse of the 64 pulse series or for line 36 is sent to an arithmetic logic unit which is shown in FIG. 1 as module 41. As indicated, this unit serves to count this pulse unit 100 cycles have been counted and causes the counter to display the stored value at the end of the proper number of counts.

There are many techniques for performing such logic and in order to avoid additional explanation and complication, circuitry for doing so has not been shown, but it will be apparent to those skilled in the art on how to implement the same. It is again noted that the measurement shown performed in FIG. 9 is an average measurement and hence, the disable start enable latch 219 is set for an average measurement during activation of a sync width measurement as indicated by parameter 4 on Table I.

Figure 10:
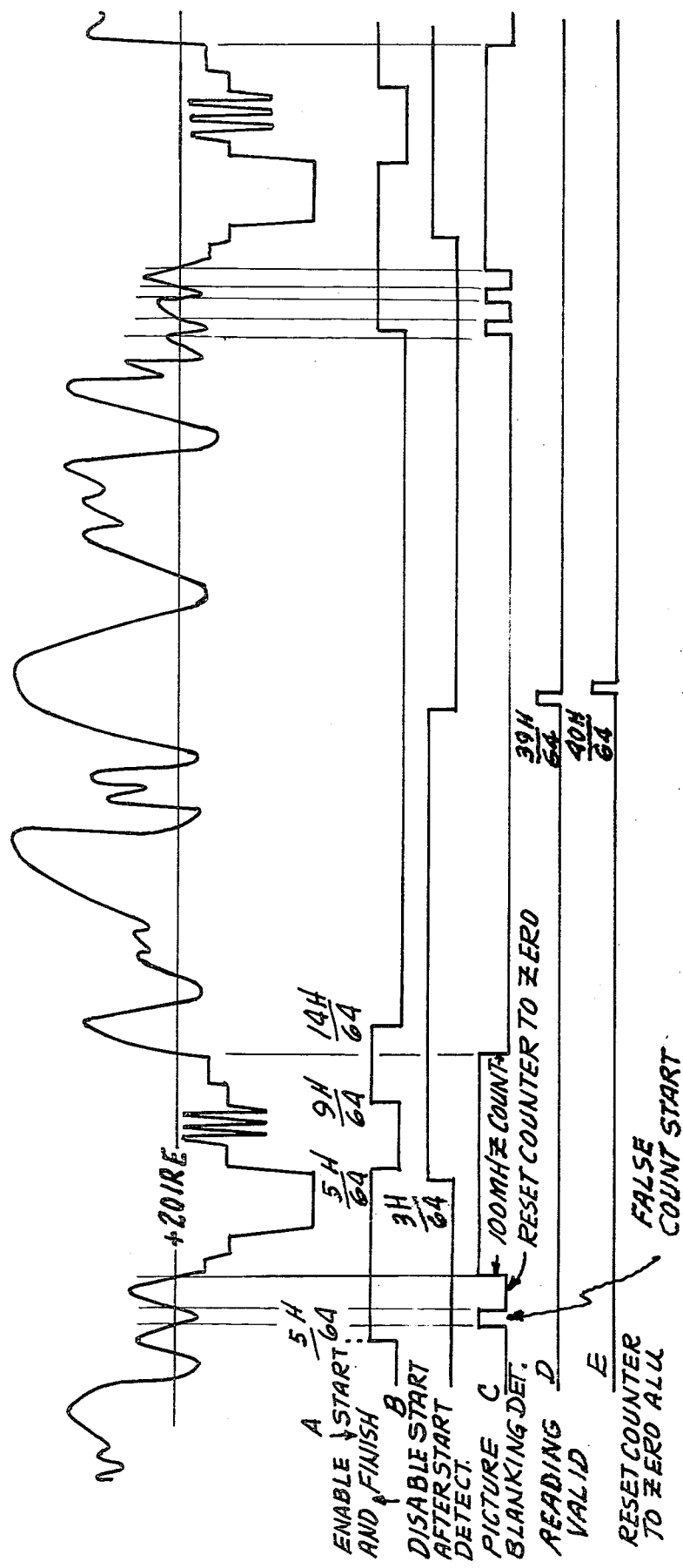
FIG. 10 is a timing diagram showing an example of a minimum line interval measurement as picture blanking.

Referring to FIG. 10, there is shown one example of a minimum measurement made at the line interval and is of picture blanking. FIG. 10A shows the output of the −Ve start enable which is from gate 142 of FIG. 4 and the +Ve finish enable from gate 143 of FIG. 4. Hence, as one can ascertain, FIGS. 9A and 10A are the same. FIG. 10B shows the output generated by latch 219 of FIG. 5 which depicts a minimum measurement and therefore the latch 219 is set on 3H/64 during a minimum line interval measurement. FIG. 10C shows the output of the start/finish latch 211. FIG. 10D shows the output of the decode 124 which again is sent to ALU. The ALU, as indicated above in regard to a minimum reading, will take the smallest value in the 1,000 samples and cause the counter to display the smallest value achieved during the 1,000 sample readings. The ALU generates a reset on each line during a "minimum" measurement which is shown in FIG. 10E, which resets the counter to zero, while causing the minimum reading as generated to be displayed.

Hence, as is understood, the primary function of the ALU as shown in FIG. 3, for example, is to monitor the number of samples for each measurement which may be 100 or 1,000 to determine when the correct number of samples has been taken so that an average sample can be displayed during an average or line measurement or that the minimum value of a reading can be displayed for a minimum measurement. The ALU also serves to control the comparator to select the proper four digits to enable proper and optimim display.

Basically as indicated, the television interval timer according to this invention serves to generate gating signals definitive of each of the items to be measured as depicted in FIG. 1. The gating functions are generated by the apparatus shown in FIG. 4 to provide a series of gates based on dividing a television line into 64 or more equal parts. Each parameter is then measured considering whether or not it starts at a positive or negative level and whether or not it ends at a positive or negative level. This information is supplied to the control circuits which control the start/finish latch, which in turn controls the counter 200. The counter enables a direct digital display of the information measured.

In order to simply explain the operation of the apparatus as indicated above, there has been a detailed description of the slot gate control and pulse routing modules as well as the start level and finish level detectors and latches. Certain measurements such as color burst amplitude and sync amplitude have not been described in any detail as these measurements are direct analog measurements and in essence, the analog value of the signal is converted by means of an analog to digital converter and then displayed by the counter. Thus the prior art is replete with many techniques for measuring sync and burst amplitude and the concept of converting the analog to a digital signal is deemed to be within the scope of the art.

In order to further clarify the nature of the measurements, we will again refer to the values indicated in Table I and specify the details for performing each measurement in conjunction with the figures supplied.

HORIZONTAL BLANKING (HB)

As indicated in FIG. 3, HB has the parameter address number 1. It is a television line measurement and hence, is done from line to line. The start transition is a negative transition and is detected at +4 IRE units. The stop transition is a positive transition and is also detected at +4 IRE units. The gating pulse used are derived from decoder 123 of FIG. 4 and hence, are pulses 59 to 14. Measurement is performed on each line from 36 to 244. Measurement is a minimum process and a 1,000 samples are taken before display. The time to take a 1,000 measurements is approximately 80.8 milliseconds. Hence, as one can ascertain, since the start transition is negative, one employs the output of OR gate 142 and the output of OR gate 143 for the finish enable. The measurement of HB is similar to the measurement performed in FIG. 10 for picture blanking and it should be clear on how the same is accomplished.

PICTURE BLANKING (PB)

PB is the parameter address number 2. This measurement is shown in FIG. 10. It is a line measurement. It is done at a start and stop reference level of +20 IRE units. PB employs a negative start and a positive finish transition. It again occurs for pulses 59 to 14 as via decode 123 and from field line number 36 to 244. It is a minimum measurement and 1,000 samples are taken. The time is also 80.8 milliseconds. It is, of course, understood that the display can be updated if desired by an additional factor of 10 and hence, one can display 1,000 and then 10,000 measurements. Taking 10,000 measurements results in a measurement time of 808 milliseconds. This, of course, can also be done for HB. While the reference levels are +20 IRE, the levels could be set to +90 IRE if the Broadcaster so desired.

FRONT PORCH (FP)

FP is the parameter address No. 3 and is a line measurement. The start level is at +4 IRE units and is a negative transition. Stop level is −20 IRE units and is a negative transition. The pulses employed are from decode 123 and hence, are from 59 to 14 occurring from field lines 36 to 244. It is a minimum measurement and 1,000 or 10,000 samples are taken as above described. Certain studios may require at start, a reference level at +20 IRE which, of course, can be accommodated by suitable adjustments of the reference level amplifier 277 shown in FIG. 5.

SYNC WIDTH (SW)

This has a parameter address of 4 and is a line measurement. It has a start and stop IRE reference level of −20 with a negative start and a positive stop transition. It is measured during pulses 59 to 14 via decode 123 and hence, lines 36 to 244. It is an average measurement as of the type depicted in FIG. 9 and 100 samples are taken. Again, the ALU can program the interval timer to first take 100 samples, then 10,000 samples. In this manner, the measurement will be completed in 8.8 milliseconds for 100 samples and 808 milliseconds for 10,000 samples.

SYNC TO BURST START (SBS)

This has an address of 5, is a line measurement, occurs at a start of −20 IRE units at a negative transition and a stop at the first transition through either ±50% points of the color burst cycles. It is also measured by using pulses 59 to 14 for the start and pulses 5 to 9 for finish and from lines 36 to 244. It is an average measurement and hence, 100 samples and then 10,000 may be taken.

SYNC TO BURST END (SBE)

This has an address parameter of 6. It is a line measurement. It occurs at a negative start transition at −20 IRE units to the last transition through ±50% of burst amplitude. It is again measured by using pulses 59 to 14 for the start and 5 to 9 for the finish during lines 36 to 244. It is an average measurement and hence, 100 samples are taken with a display update every 10,000 samples.

SYNC TO VIDEO START (SVS)

This has an address parameter of 7. It is a line measurement with a negative start transition measured at −20 IRE units. It is a positive stop transition measured at +4 IRE. It again employs pulses 59 to 14 and lines 36 to 244 and is a minimum measurement and hence, 1,000 samples are taken as is done for parameters 1, 2 and 3. Certain studios may require a stop reference level at +20 IRE.

BURST WIDTH (BW)

This has an address parameter of 8. It is a line measurement. In counting burst, as long as the burst amplitude exceeds ±50%, the counter is operated and counts one half cycles of burst each time the comparator indicates an amplitude above or below 50% of burst amplitude. The pulses employed are 5 to 9 which are derived from decode 122 and are measured from field line 36 to 244. It is a direct measurement. As can be seen from FIG. 5, the burst cycles are applied directly to counter 200. As can be seen from FIGS. 3 and 5, this enables the counter to provide a direct reading of the burst cycles. This is a one time measurement which takes 128 milliseconds, but can be expanded to 10,000 times. The measurement reading changes in one-half cycle steps due to the start and stop of the burst conditions.

SYNC RISE TIME (SRT)

This is address parameter number 9. It is a line measurement and has a positive start transition measured at −36 IRE with a positive stop transition measured at −4 IRE. It employs pulses 3 to 14 as supplied by decoder 123 of FIG. 4 during selection of parameter 9 and is measured from lines 36 to 244. It is an average measurement and hence, 100 samples are taken.

VERTICAL BLANKING (VB)

This has an address parameter of 10. It is a field measurement and is a negative start and a positive stop transition both measured at +12.5 IRE. It is measured in 50 lines using pulses 13 to 53 from decode 103 and is measured from lines 36 to 265 for field 2 and from lines 20 to 36 for field 1. It is a minimum measurement and 100 samples are taken. Vertical blanking measurement is shown in FIGS. 6 and the timing is shown in FIG. 7. Since it is a field measurement, measurement is taken only between field 20 to field 1.

PICTURE START (PS)

This has an address parameter of 11. It also has a field measurement. It has a start which occurs at the start of the field as indicated in FIG. 7 and which is the pulse produced by decode 304 of FIG. 6. It has a positive stop transition measured at +12.5 IRE. It again employs pulses 13 to 63 from decode 103 and the timing shown in FIG. 7.

EQUALIZING PULSE WIDTH (EP)

This is parameter address number 12. It is a field measurement. It has a negative start and positive stop transition which are measured at −20 IRE. It employs pulses 25 to 37 as generated by decode 121 of FIG. 4 and is measured from lines 2 and 9 of field 1 and lines 1 and 8 of field 2. The measuring time is shown in FIG. 8. It is an average measurement and 100 measurements are made at the rate of two sample measurements per field.

BURST AMPLITUDE (BA)

This is parameter 14. As indicated BA is strictly an analog measurement and it is converted to a digital signal by means of an amplitude detector which is coupled to a digital to analog converter. The timing during which the measurement is made employs pulses 6 and 7 as generated by decode 126 of FIG. 4 and it is a line measurement which is measured from lines 36 to 244. Since it is an analog measurement, it is an average and is done once or 100 times under control of the ALU. The analog sample occurs on every line from 36 to 244 and the value is averaged by using a conventional averging circuit. The analog to digital conversion starts on line 36 of the first field and takes two fields to complete.

SYNC AMPLITUDE (S)

This is parameter 15. It is a line measurement and employs an amplitude detector. It is gated by means of pulses 2 and 3 as generated by decode 127 of FIG. 4 and occurs during lines 36 to 244. It is handled in the same manner as the burst amplitude.

Thus, as can be seen from the above noted description, the television interval timer can serve to provide an accurate digital display using the parameters listed above by generating proper slots or gating waveforms to thereby perform such measurements on the video signal within the timing and gating durations generated and as described above. The parameter to be measured is selected by means of a front panel switch and the measured value is automatically displayed. Each measurement is performed within preset or predetermined limits to assure that the measurement as displayed is both of the correct duration and of the proper amplitude.

It is, of course, understood that many additional measurements can be implemented by use of the above described techniques and all such alternate measurements should be apparent to those skilled in the art upon reading the foregoing specification.

We claim:

1. Apparatus for measuring the time duration of parameters associated with a television signal, said parameters to be measured associated with a conventional television signal and having timing intervals which are predetermined according to standards associated with said television signal, comprising:
    (a) means responsive to said television signal to provide a timing signal synchronized thereto and consisting of a predetermined number of equally spaced pulses indicative of a television line,
    (b) selectable means operative to select any one of a given number of parameters to be measured,
    (c) logic means responsive to said selectable means and said timing signal to generate a control signal containing a selected number of said pulses which are indicative of the timing interval of said parameter, within said television signal,
    (d) reference means responsive to said selectable means and operative to provide a reference level for determining whether said television signal exhibits a level within predetermined limits for said parameter selected,
    (e) counting means responsive to said reference means and said control signal for providing a count indicative of said timing interval of said parameter when said television signal exhibits said level within said predetermined limits,
    (f) means coupled to said counting means for displaying said count whereby the timing interval associated with said parameter is displayed.

2. The apparatus according to claim 1 wherein said means responsive to said television signal to provide a timing signal comprises a phase locked loop having an oscillator therein operating at a frequency which is a given multiple greater than the frequency of a television line, to provide at an output, said predetermined number of pulses which separate said television line into a predetermined number of equally spaced intervals.

3. The apparatus according to claim 2 wherein said number of pulses in 2 n pulses per television line; where n is a positive integer greater than 1.

4. The apparatus according to claim 1 wherein said selectable means comprises a plurality of switches, each one capable of selecting a different parameter associated with said television signal, a parameter selector matrix coupled to said switches and operative to provide at an output, a digital code indicative of the particular switch selected.

5. The apparatus according to claim 1 wherein said logic means includes a plurality of decode gates responsive to said timing signal and said selected parameter to provide an output consisting of different preselected ones of said pulses according to the predetermined position of said parameter within said television line.

6. The apparatus according to claim 1 wherein said reference means includes a first transition gating means operative to provide a first gating start signal when said parameter to be measured begins with a given transition in a conventional television signal, a second transition gating means operative to provide a second gating finish signal when said parameter to be measured ends with a given transition in a conventional television signal and means responsive to said selectable means to provide said first and second gating signals according to said parameter as selected.

7. The apparatus according to claim 6 further comprising comparator means responsive to said first and second gating signals and said reference level for providing a start reference output when said television signal is within said predetermined limits at said start timing interval, and finish reference output when said television signal is within said predetermined limits at the finish of said timing interval.

8. The apparatus according to claim 7 including latching means coupled to said counter and responsive to said start reference output to enable said counter to commence counting during said start signal, said latching means further responsive to said finish reference output to cause said counter to cease counting during said finish reference signal.

9. The apparatus according to claim 1 wherein said counting means includes a multiple stage binary to decimal counter and a source of stable input signals coupled to said counter to enable said counter to count said stable signal during the presence of said reference level.

10. The apparatus according to claim 8 further comprising arithmetic control means responsive to said parameter as selected and coupled to said counter for selecting a given number of said stages for display according to said parameter as selected.

11. The apparatus according to claim 1 wherein said logic means includes means responsive to said selectable means and said timing signal for providing said control signal indicative of the timing interval of said parameter which occurs at a television line rate.

12. The apparatus according to claim 11 wherein said parameter as selected includes at least one of the following, horizontal blanking, picture blanking, front porch width, sync width, sync to burst start, sync to burst end, sync to video start, burst width, sync rise time.

13. The apparatus according to claim 1 wherein said logic means includes means responsive to said selectable means and said timing signal for providing said control signal indicative of the timing interval of said parameter selected which occurs at a television field rate.

14. The apparatus according to claim 13 wherein said parameter as selected includes at least one of the following, vertical blanking, picture start, equalizing pulse width, serration width.

15. The apparatus according to claim 1 further including an amplitude detector responsive to the operation of at least one of said selectable means, to provide an output indicative of the amplitude of said selected parameter during the presence of said timing signal to provide a control signal indicative of said amplitude and means for converting said control signal to digital form for applying the same to said counter.

16. The apparatus according to claim 15 wherein said at least one parameter is burst amplitude.

17. The apparatus according to claim 15 wherein said at least one parameter is sync amplitude.

18. The apparatus according to claim 1 wherein said reference means includes means for generating said reference level according to IRE units specifying the allowable amplitude limits of said parameter.

19. The apparatus according to claim 1 including minimum indicating means coupled to said counting means and responsive to said parameter selected to cause said counting means to provide said count a predetermined number of times, and means responsive to the minimum count provided during said predetermined number of times to cause the minimum count to be displayed according to the parameter selected.

20. The apparatus according to claim 19 wherein said parameter count displayed as a minimum includes at least the following, horizontal blanking, picture blanking, front porch width, sync to video start, vertical blanking, picture start.

21. The apparatus according to claim 1 including average indicating means coupled to said counting means and responsive to said parameter selected to cause said counting means to provide said count a predetermined number of times and means responsive to the count provided during said minimum number of times to cause an average count to be displayed according to the parameter selected.

22. The apparatus according to claim 21 wherein said parameter count displayed as an average includes at least one of the following, sync width, sync to burst start, sync to burst end, sync rise time, equalizing pulse width, serration width.

* * * * *